(12) United States Patent
Song et al.

(10) Patent No.: US 11,991,676 B2
(45) Date of Patent: May 21, 2024

(54) METHOD AND DEVICE FOR TRANSMITTING DATA IN WIRELESS LAN SYSTEM

(71) Applicant: LG ELECTRONICS INC., Seoul (KR)

(72) Inventors: Taewon Song, Seoul (KR); Suhwook Kim, Seoul (KR); Jeongki Kim, Seoul (KR); Kiseon Ryu, Seoul (KR); Insun Jang, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 492 days.

(21) Appl. No.: 17/272,513

(22) PCT Filed: Sep. 18, 2019

(86) PCT No.: PCT/KR2019/012025
§ 371 (c)(1),
(2) Date: Mar. 1, 2021

(87) PCT Pub. No.: WO2020/060168
PCT Pub. Date: Mar. 26, 2020

(65) Prior Publication Data
US 2022/0110119 A1    Apr. 7, 2022

Related U.S. Application Data

(60) Provisional application No. 62/733,091, filed on Sep. 19, 2018.

(51) Int. Cl.
*H04W 72/04* (2023.01)
*H04W 72/0453* (2023.01)
(Continued)

(52) U.S. Cl.
CPC ... *H04W 72/0453* (2013.01); *H04W 72/1263* (2013.01); *H04W 72/23* (2023.01); *H04W 84/12* (2013.01)

(58) Field of Classification Search
None
See application file for complete search history.

(56) References Cited

U.S. PATENT DOCUMENTS

2008/0225768 A1* 9/2008 Wentink ............ H04W 52/0216
370/311
2013/0070701 A1 3/2013 Merlin et al.
(Continued)

FOREIGN PATENT DOCUMENTS

| KR | 20100067893 | 6/2010 |
|---|---|---|
| WO | 2018144156 | 8/2018 |

OTHER PUBLICATIONS

PCT International Application No. PCT/KR2019/012025, International Search Report dated Dec. 26, 2019, 4 pages.
(Continued)

*Primary Examiner* — Steve R Young
(74) *Attorney, Agent, or Firm* — LEE, HONG, DEGERMAN, KANG & WAIMEY

(57) ABSTRACT

A method and a device for transmitting data in a wireless LAN system are proposed. Specifically, an AP transmits a band switch announcement element through a first band supported by a first and a second RF. The AP changes the first band, supported by the second RF, to a second band on the basis of the band switch announcement element. The AP transmits first data to an STA through the first band supported by the first RF and the second band supported by the second RF. The first data is transmitted through a multiple band in which the first band and the second band are combined.

12 Claims, 28 Drawing Sheets

(51) Int. Cl.
*H04W 72/12* (2023.01)
*H04W 72/1263* (2023.01)
*H04W 72/23* (2023.01)
*H04W 84/12* (2009.01)

(56) References Cited

U.S. PATENT DOCUMENTS

| | | | |
|---|---|---|---|
| 2015/0009879 A1* | 1/2015 | Kim | H04W 74/002 |
| | | | 370/311 |
| 2016/0007247 A1* | 1/2016 | Lee | H04W 36/0072 |
| | | | 370/331 |
| 2019/0182714 A1* | 6/2019 | Chu | H04W 74/08 |
| 2021/0204315 A1* | 7/2021 | Chu | H04W 8/24 |
| 2023/0156492 A1* | 5/2023 | Gan | H04W 76/15 |
| | | | 370/329 |

OTHER PUBLICATIONS

Bajko, et al., "CSA with channel switch time announcement," IEEE 802.11-18/0203r02, Jan. 2018, 5 pages.

* cited by examiner

FIG. 1
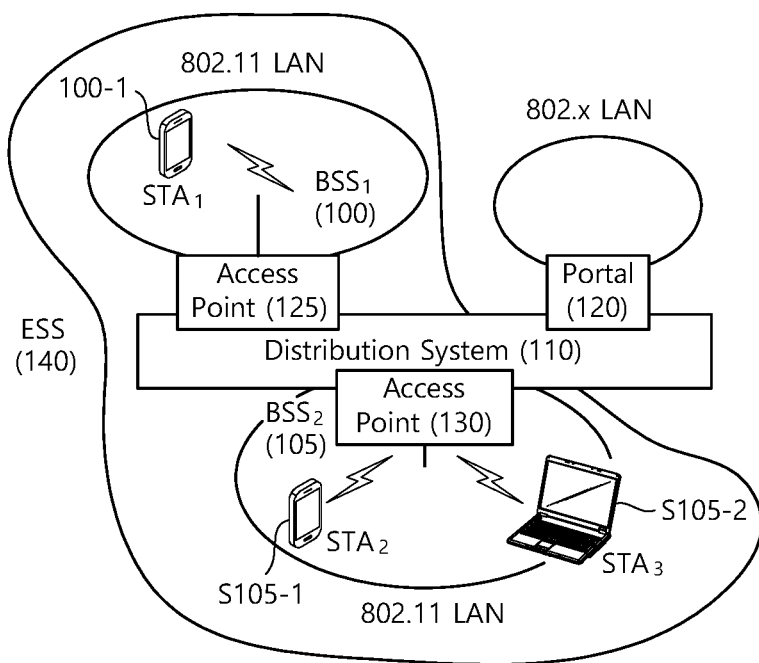
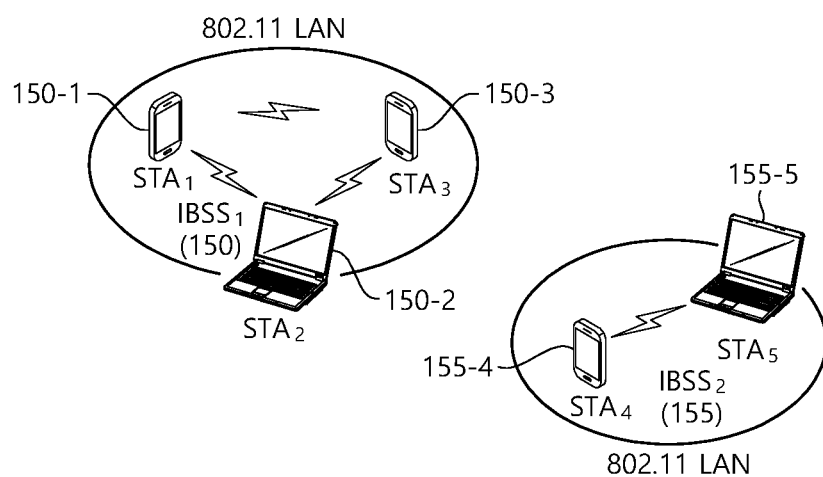

FIG. 20

| Element ID | Length | Channel Switch Mode | New Channel Number | Channel Switch Count |
|---|---|---|---|---|
| 1 | 1 | 1 | 1 | 1 |

Octets:

FIG. 21

| Element ID | Length | Channel Switch Mode | New Operating Class | New Channel Number | Channel Switch Count |
|---|---|---|---|---|---|
| 1 | 1 | 1 | 1 | 1 | 1 |

Octets:

METHOD AND DEVICE FOR TRANSMITTING DATA IN WIRELESS LAN SYSTEM

CROSS-REFERENCE TO RELATED APPLICATIONS

This application is the National Stage filing under 35 U.S.C. 371 of International Application No. PCT/KR2019/012025, filed on Sep. 18, 2019, which claims the benefit of U.S. Provisional Application No. 62/733,091, filed on Sep. 19, 2018, the contents of which is incorporated by reference herein in its entirety.

BACKGROUND

Field

The present disclosure relates to a technique for transmitting data in a wireless local area network (WLAN) system and, more particularly, to a method and a device for transmitting data through a multi-band by changing at least one antenna or RF chain to a different band in a WLAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY

The present disclosure proposes a method and a device for transmitting data in a wireless local area network (WLAN) system.

An embodiment of the present disclosure proposes a method for transmitting data.

The embodiment may be performed in a network environment supporting a next-generation WLAN system. The next-generation WLAN system may be a WLAN system evolving from an 802.11ax system and may satisfy backward compatibility with the 802.11ax system. The next-generation WLAN system may correspond to an extremely high throughput (EHT) WLAN system or an 802.11be WLAN system.

The embodiment proposes a method for transmitting data through a multi-band by changing at least one antenna or RF chain to a different band in a next-generation WLAN, such as an EHT WLAN system.

The embodiment may be performed by an access point (AP), and a station (STA) of the embodiment may correspond to a STA supporting an EHT WLAN system. The AP and the STA may support a multi-band (or multi-link).

The AP transmits a Band Switch Announcement element to the STA through a first band supported by first and second radio frequencies (RFs).

The AP change the first band supported by the second RF to a second band based on the Band Switch Announcement element. The Band Witch Announcement element is used for the AP to notify the STA that a band supported by at least one RF is to be changed. Therefore, the AP may change a band supported by an RF after transmitting the Band Switch Announcement element without negotiating with the STA or receiving an ACK from the ACK.

In this embodiment, the AP assumes that the AP has the first and second RFs. Since the first and second RFs support the first band until the Band Switch Announcement element is transmitted, the AP can transmit data only through the first band. However, after the Band Switch Announcement element is transmitted, the first RF still supports the first band, while the second RF supports the second band to which the first band is changed.

In the next-generation WLAN system, the first and second RFs can change a band and thus may be referred to as switchable RFs. Although the embodiment is limited to a case where only a band supported by the second RF is changed, a band supported by the first RF may be changed by the Band Switch Announcement element.

The AP transmits first data to the STA through the first band supported by the first RF and the second band supported by the second RF. Here, the first data is transmitted through a multi-band into which the first band and the second band aggregated. That is, the AP may change a band for the second RF and may then transmit the data through the multi-band.

The first band includes a first primary channel, and the second band includes a second primary channel.

When the multi-band includes only the two bands which are aggregated, the first band may be a 2.4 GHz or 5 GHz band, and the second band may be a 6 GHz band. When the multi-band further include a third band, the first band may be a 2.4 GHz band, the second band may be a 5 GHz band, and the third band may be a 6 GHz band. The foregoing configurations of the bands are provided only for illustration, and the WLAN system may support various numbers of bands and channels.

According to an embodiment proposed in the present disclosure, an antenna or RF chain to establish a multi-band may be configured, thereby solving a spatial constraint of a device and enabling efficient data transmission through the multi-band.

BRIEF DESCRIPTION OF THE DRAWINGS

FIG. 1 is a conceptual view illustrating the structure of a wireless local area network (WLAN).

FIG. 20 illustrates an example of a Channel Switch Announcement element format.

FIG. 21 illustrates an example of an Extended Channel Switch Announcement element format.

DESCRIPTION OF EXEMPLARY EMBODIMENTS

Figure 2:
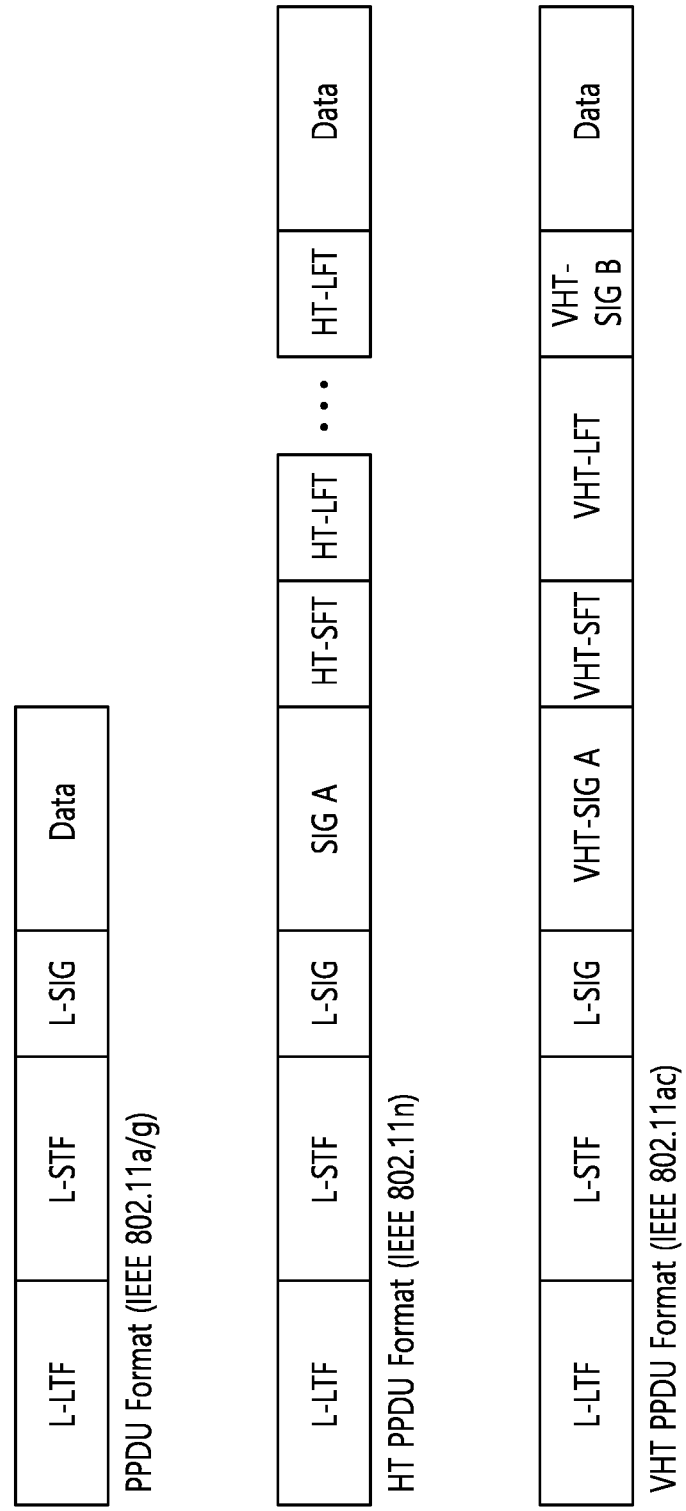
FIG. 2 is a diagram illustrating an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs (100, 105) (hereinafter, referred to as BSS). The BSSs (100, 105), as a set of an AP and an STA such as an access point (AP) (125) and a station (STA1) (100-1) which are successfully synchronized to communicate with each other, are not concepts indicating a specific region. The BSS (105) may include one or more STAs (105-1, 105-2) which may be joined to one AP (130).

The BSS may include at least one STA, APs providing a distribution service, and a distribution system (DS) (110) connecting multiple APs.

The distribution system (110) may implement an extended service set (ESS) (140) extended by connecting the multiple BSSs (100, 105). The ESS (140) may be used as a term indicating one network configured by connecting one or more APs (125, 130) through the distribution system (110). The AP included in one ESS (140) may have the same service set identification (SSID).

A portal (120) may serve as a bridge which connects the wireless LAN network (IEEE 802.11) and another network (e.g., 802.X).

In the BSS illustrated in the upper part of FIG. 1, a network between the APs (125, 130) and a network between the APs (125, 130) and the STAs (100-1, 105-1, 105-2) may be implemented. However, the network is configured even between the STAs without the APs (125, 130) to perform communication. A network in which the communication is performed by configuring the network even between the STAs without the APs (125, 130) is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs (150-1, 150-2, 150-3, 155-4, 155-5) are managed by a distributed manner. In the IBSS, all STAs (150-1, 150-2, 150-3, 155-4, 155-5) may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in various meanings, for example, in wireless LAN communication, this term may be used to signify a STA participating in uplink MU MIMO and/or uplink OFDMA transmission. However, the meaning of this term will not be limited only to this.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, and so on. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
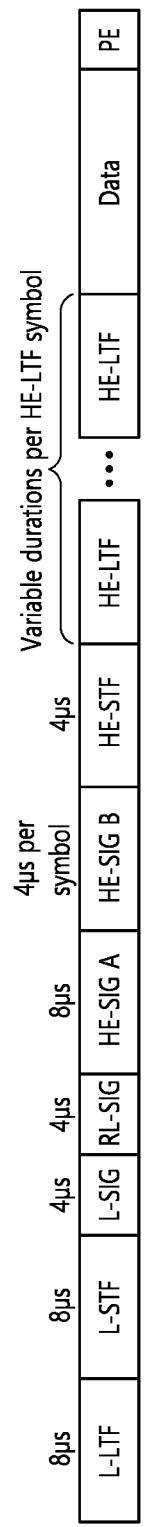
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8/Ls).

More detailed description of the respective fields of FIG. 3 will be made below.

Figure 4:
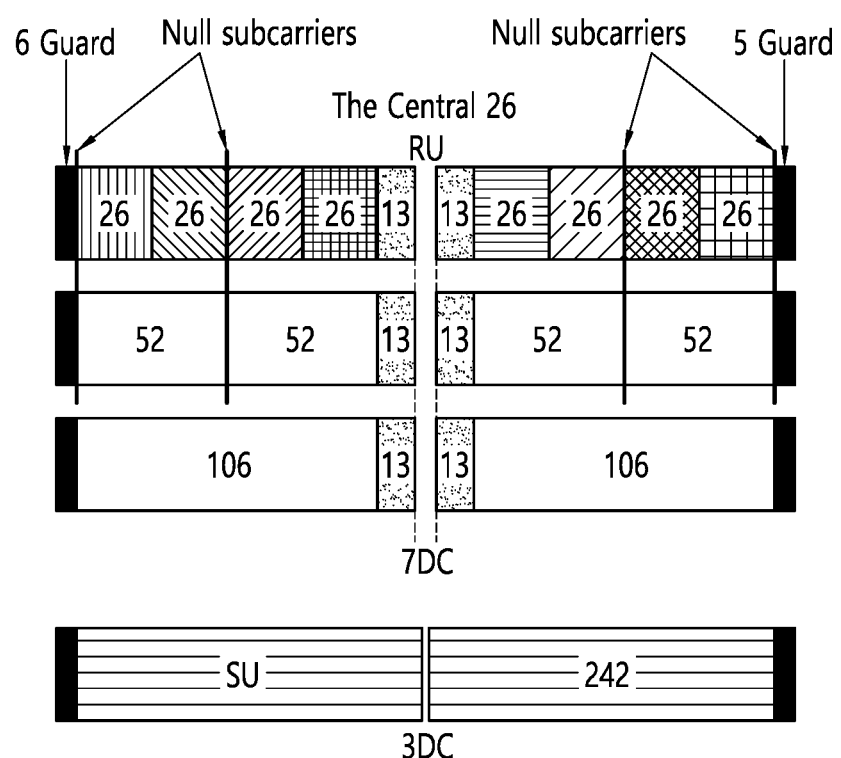
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and, in this case, as illustrated in a lowermost part of FIG. 4, one 242-unit may be used and, in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
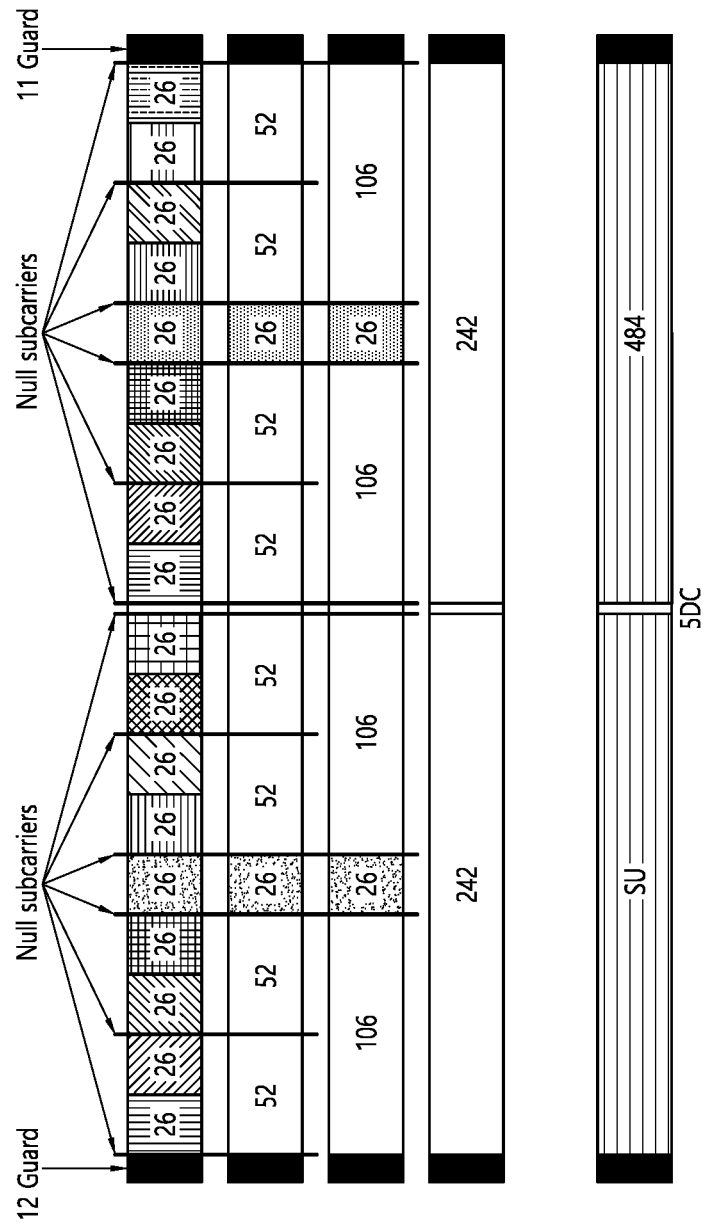
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like, may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
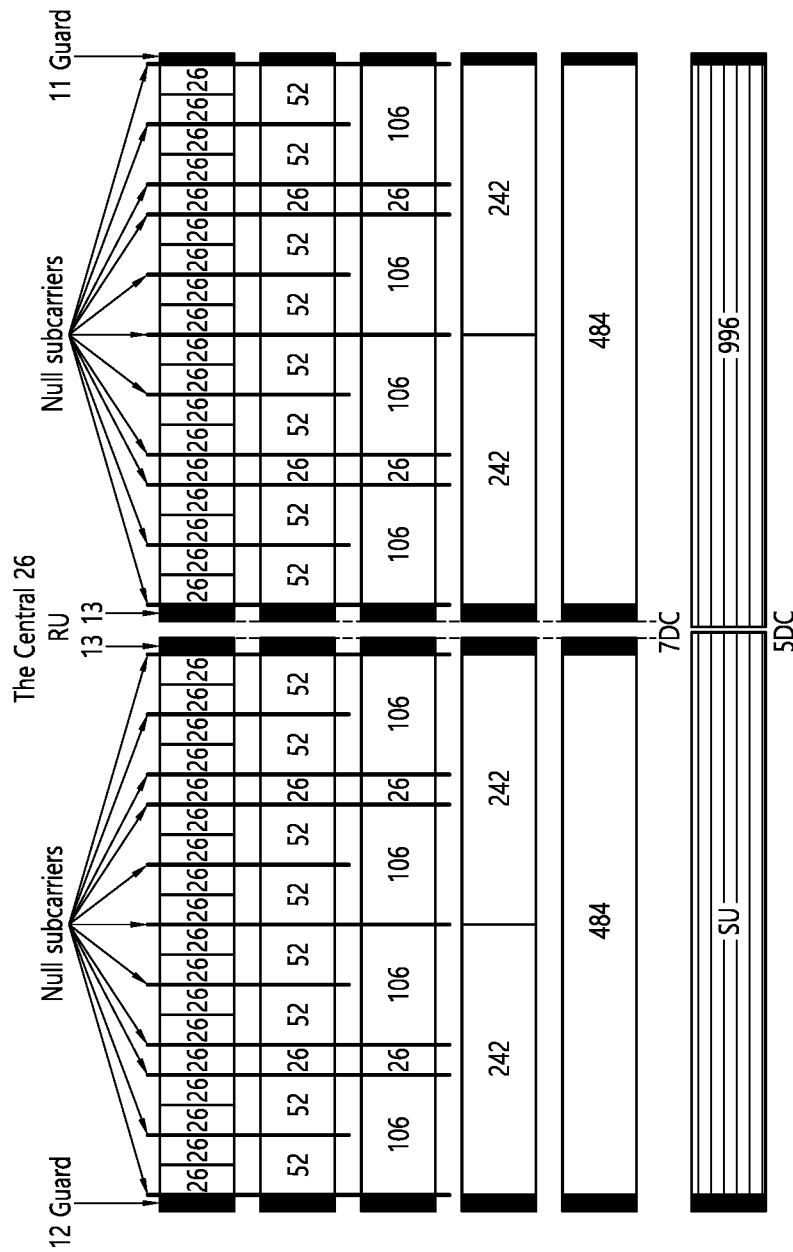
FIG. 6 is a diagram illustrating a layout of resource units (RUs) used in a band of 80 MHz.

FIG. 6 is a diagram illustrating a layout of resource units (RUs) used in a band of 80 MHz.

Figure 26:
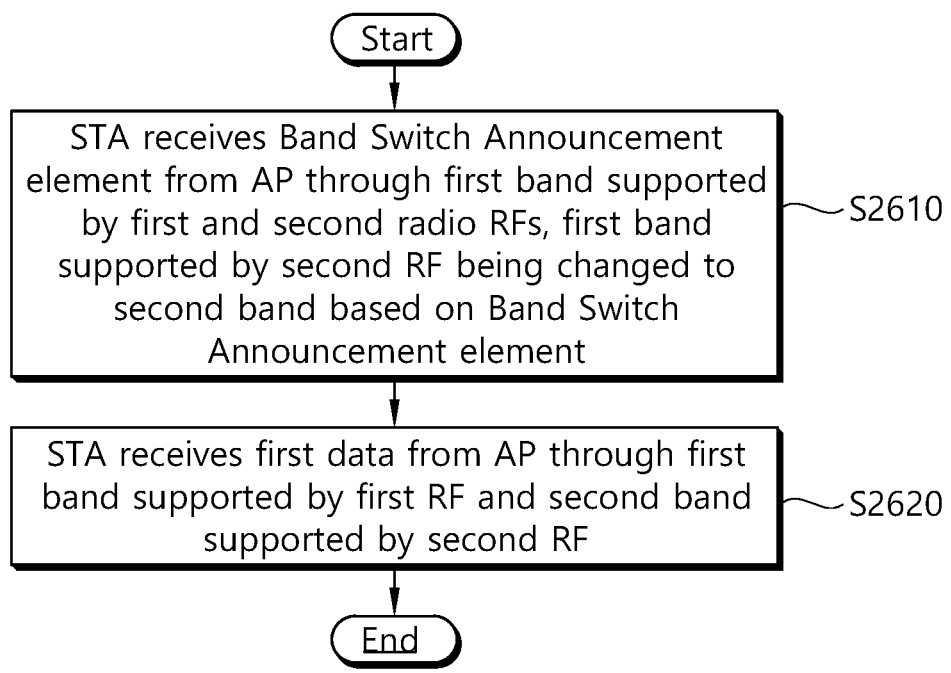
FIG. 26 is a flowchart illustrating a procedure in which a STA receives data according to an embodiment.

Similarly to a case in which the RUs having various RUs are used in one example of each of FIG. 4 or 5, 26-RU, 52-RU, 106-RU, 242-RU, 484-RU, and the like, may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and, in this case, 5 DC tones may be inserted.

Meanwhile, the detailed number of RUs may be modified similarly to one example of each of FIG. 4 or FIG. 5.

Figure 7:
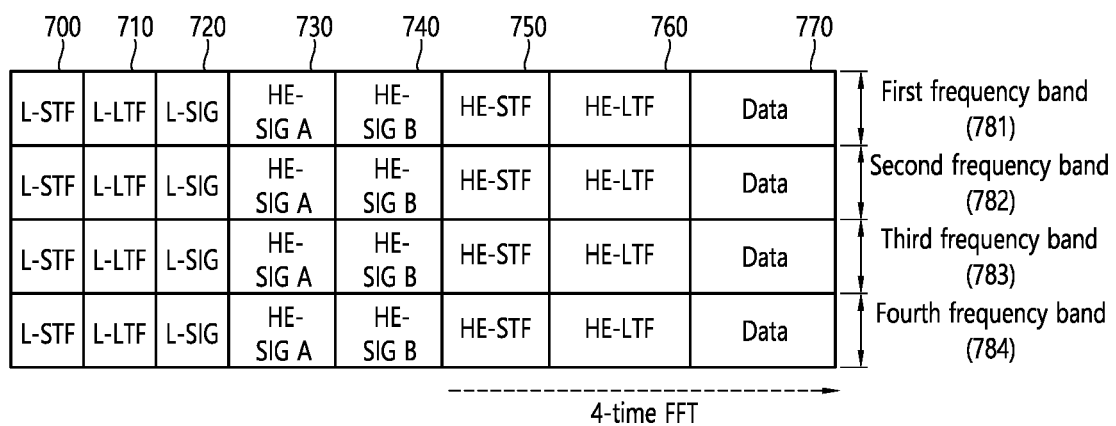
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF (700) may include a short training orthogonal frequency division multiplexing (OFDM) symbol. The L-STF (700) may be used for frame detection, automatic gain control (AGC), diversity detection, and coarse frequency/time synchronization.

An L-LTF (710) may include a long training orthogonal frequency division multiplexing (OFDM) symbol. The L-LTF (710) may be used for fine frequency/time synchronization and channel prediction.

An L-SIG (720) may be used for transmitting control information. The L-SIG (720) may include information regarding a data rate and a data length. Further, the L-SIG (720) may be repeatedly transmitted. That is, a new format, in which the L-SIG (720) is repeated (for example, may be referred to as R-LSIG) may be configured.

An HE-SIG-A (730) may include the control information common to the receiving station.

In detail, the HE-SIG-A (730) may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), and 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

In addition, the HE-SIG-A (730) may be composed of two parts: HE-SIG-A1 and HE-SIG-A2. HE-SIG-A1 and HE-SIG-A2 included in the HE-SIG-A may be defined by the following format structure (fields) according to the PPDU. First, the HE-SIG-A field of the HE SU PPDU may be defined as follows.

TABLE 1

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTF. Equation (28-6), Equation (28-9), Equation (28-12), Equation (28-14), Equation (28-16) and Equation (28-18) apply if the Beam Change field is set to 1. Set to 0 to indicate that the pre-HE modulated fields of the PPDU are spatially mapped the same way as the first symbol of the HE-LTF on each tone. Equation (28-8), Equation (28-10), Equation (28-13), Equation (28-15), Equation (28-17) and Equation (28-19) apply if the Beam Change field is set to 0.(#16803) |
| | B2 | UL/DL | 1 | Indicates whether the PPDU is sent UL or DL. Set to the value indicated by the TXVECTOR parameter UPLINK_FLAG. |
| | B3-B6 | MCS | 4 | For an HE SU PPDU: Set to n for MCSn, where n = 0, 1, 2, . . . , 11 Values 12-15 are reserved For HE ER SU PPDU with Bandwidth field set to 0 (242-tone RU): Set to n for MCSn, where n = 0, 1, 2 Values 3-15 are reserved For HE ER SU PPDU with Bandwidth field set to 1 (upper frequency 106-tone RU): Set to 0 for MCS 0 Values 1-15 are reserved |
| | B7 | DCM | 1 | Indicates whether or not DCM is applied to the Data field for the MCS indicated. If the STBC field is 0, then set to 1 to indicate that DCM is applied to the Data field. Neither DCM nor STBC shall be applied if(#15489) both the DCM and STBC are set to 1. Set to 0 to indicate that DCM is not applied to the Data field. NOTE-DCM is applied only to HE-MCSs 0, 1, 3 and 4. DCM is applied only to 1 and 2 spatial streams. DCM is not applied in combination with STBC(#15490). |
| | B8-B13 | BSS Color | 6 | The BSS Color field is an identifier of the BSS. Set to the value of the TXVECTOR parameter BSS_-COLOR. |
| | B14 | Reserved | 1 | Reserved and set to 1 |
| | B15-B18 | Spatial Reuse | 4 | Indicates whether or not spatial reuse is allowed during the transmission of this PPDU(#16804). Set to a value from Table 28-21 (Spatial Reuse field encoding for an HE SU PPDU, HE ER SU PPDU, and HE MU PPDU), see 27.11.6 (SPATIAL_REUSE). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B20 | Bandwidth | 2 | For an HE SU PPDU: Set to 0 for 20 MHz Set to 1 for 40 MHz Set to 2 for 80 MHz Set to 3 for 160 MHz and 80 + 80 MHz For an HE ER SU PPDU: Set to 0 for 242-tone RU Set to 1 for upper frequency 106-tone RU within the primary 20 MHz Values 2 and 3 are reserved |

TABLE 1-continued

| Two Parts of HE-SIG-A | Bit | Field | Number of bits | Description |
|---|---|---|---|---|
| | B21-B22 | GI + LTF Size | 2 | Indicates the GI duration and HE-LTF size.<br>Set to 0 to indicate a 1x HE-LTF and 0.8 μs GI<br>Set to 1 to indicate a 2x HE-LTF and 0.8 μs GI<br>Set to 2 to indicate a 2x HE-LTF and 1.6 μs GI<br>Set to 3 to indicate:<br>a 4x HE-LTF and 0.8 μs GI if both the DCM and STBC fields are 1. Neither DCM nor STBC shall be applied if(#Ed) both the DCM and STBC fields are set to 1.<br>a 4x HE-LTF and 3.2 μs GI, otherwise |
| | B23-B25 | NSTS And Midamble Periodicity | 3 | If the Doppler field is 0, indicates the number of space-time streams.<br>Set to the number of space-time streams minus 1<br>For an HE ER SU PPDU, values 2 to 7 are reserved<br>If the Doppler field is 1, then B23-B24 indicates the number of space time streams, up to 4, and B25 indicates the midamble periodicity.<br>B23-B24 is set to the number of space time streams minus 1.<br>For an HE ER SU PPDU, values 2 and 3 are reserved<br>B25 is set to 0 if TXVECTOR parameter MIDAMBLE_PERIODICITY is 10 and set to 1 if TXVECTOR parameter MTDAMBLE_PERIODICITY is 20. |
| HE-SIG-A2 (HE SU PPDU) or HE-SIG-A3 (HE ER SU PPDU) | B0-B6 | TXOP | 7 | Set to 127 to indicate no duration information if(#15491) TXVECTOR parameter TXOP_DURATION is set to UNSPECIFIED.<br>Set to a value less than 127 to indicate duration information for NAV setting and protection of the TXOP as follows:<br>If TXVECTOR parameter TXOP_DURATION is less than 512, then B0 is set to 0 and B1-B6 is set to floor(TXOP_DURATION/8)(#16277).<br>Otherwise, B0 is set to 1 and B1-B6 is set to floor((TXOP_DURATION − 512 )/128)(#16277).<br>where(#16061)<br>B0 indicates the TXOP length granularity. Set to 0 for 8 μs; otherwise set to 1 for 128 μs.<br>B1-B6 indicates the scaled value of the TXOP_DURATION |
| | B7 | Coding | 1 | Indicates whether BCC or LDPC is used:<br>Set to 0 to indicate BCC<br>Set to 1 to indicate LDPC |
| | B8 | LDPC Extra Symbol Segment | 1 | Indicates the presence of the extra OFDM symbol segment for LDPC:<br>Set to 1 if an extra OFDM symbol segment for LDPC is present<br>Set to 0 if an extra OFDM symbol segment for LDPC is not present<br>Reserved and set to 1 if the Coding field is set to 0(#15492). |
| | B9 | STBC | 1 | If the DCM field is set to 0, then set to 1 if space time block coding is used. Neither DCM nor STBC shall be applied if(#15493) both the DCM field and STBC field are set to 1.<br>Set to 0 otherwise. |
| | B10 | Beam-formed(#16038) | 1 | Set to 1 if a beamforming steering matrix is applied to the waveform in an SU transmission.<br>Set to 0 otherwise. |
| | B11-B12 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B13 | PE Disambiguity | 1 | Indicates PE disambiguity(#16274) as defined in 28.3.12 (Packet extension). |
| | B14 | Reserved | 1 | Reserved and set to 1 |
| | B15 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled midamble periodicity plus 1 (sec 28.3.11.16 Midamble), the midamble is not present, but the channel is fast varying. It recommends that midamble may be used for the PPDUs of the reverse link.<br>Set to 0 otherwise. |

TABLE 1-continued

| Two Parts of HE-SIG-A | Bit | Field | Number of bits | Description |
|---|---|---|---|---|
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

In addition, the HE-SIG-A field of the HE MU PPDU may be defined as follows.

TABLE 2

| Two Parts of HE-SIG-A | Bit | Field | Number of bits | Description |
|---|---|---|---|---|
| HE-SIG-A1 | B0 | UL/DL | 1 | Indicates whether the PPDU is sent UL or DL. Set to the value indicated by the TXVECTOR parameter UPLINK_FLAG. (#16805) NOTE-The TDLS peer can identify the TDLS frame by To DS and From DS fields in the MAC header of the MPDU. |
| | B1-B3 | SIGB MCS | 3 | Indicates the MCS of the HE-SIG-B field: Set to 0 for MCS 0 Set to 1 for MCS 1 Set to 2 for MCS 2 Set to 3 for MCS 3 Set to 4 for MCS 4 Set to 5 for MCS 5 The values 6 and 7 are reserved |
| | B4 | SIGB DCM | 1 | Set to 1 indicates that the HE-SIG-B is modulated with DCM for the MCS. Set to 0 indicates that the HE-SIG-B is not modulated with DCM for the MCS. NOTE-DCM is only applicable to MCS 0, MCS 1, MCS 3, and MCS 4. |
| | B5-B10 | BSS Color | 6 | The BSS Color field is an identifier of the BSS. Set to the value of the TXVECTOR parameter BSS_-COLOR. |
| | B11-B14 | Spatial Reuse | 4 | Indicates whether or not spatial reuse is allowed during the transmission of this PPDU(#16806). Set to the value of the SPATIAL_REUSE parameter of the TXVECTOR, which contains a value from Table 28-21 (Spatial Reuse field encoding for an HE SU PPDU. HE ER SU PPDU, and HE MU PPDU) (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B17 | Bandwidth | 3 | Set to 0 for 20 MHz. Set to 1 for 40 MHz. Set to 2 for 80 MHz non-preamble puncturing mode. Set to 3 for 160 MHz and 80 + 80 MHz non-preamble puncturing mode. If the SIGB Compression field is 0: Set to 4 for preamble puncturing in 80 MHz, where in the preamble only the secondary 20 MHz is punctured. Set to 5 for preamble puncturing in 80 MHz, where in the preamble only one of the two 20 MHz sub-channels in secondary 40 MHz is punctured. Set to 6 for preamble puncturing in 160 MHz or 80 + 80 MHz, where in the primary 80 MHz of the preamble only the secondary 20 MHz is punctured. Set to 7 for preamble puncturing in 160 MHz or 80 + 80 MHz, where in the primary 80 MHz of the preamble the primary 40 MHz is present. If the SIGB Compression field is 1 then values 4-7 are reserved. |

TABLE 2-continued

| Two Parts of HE-SIG-A | Bit | Field | Number of bits | Description |
|---|---|---|---|---|
| | B18-B21 | Number Of HE-SIG-B Symbols Or MU-MIMO Users | 4 | If the HE-SIG-B Compression field is set to 0, indicates the number of OFDM symbols in the HE-SIG-B field: (#15494) Set to the number of OFDM symbols in the HE-SIG-B field minus 1 if the number of OFDM symbols in the HE-SIG-B field is less than 16; Set to 15 to indicate that the number of OFDM symbols in the HE-SIG-B field is equal to 16 if Longer Than 16 HE SIG-B OFDM Symbols Support sub-field of the HE Capabilities element transmitted by at least one recipient STA is 0; Set to 15 to indicate that the number of OFDM symbols in the HE-SIG-B field is greater than or equal to 16 if the Longer Than 16 HE SIG-B OFDM Symbols Support subfield of the HE Capabilities element transmitted by all the recipient STAs are 1 and if the HE-SIG-B data rate is less than MCS 4 without DCM. The exact number of OFDM symbols in the HE-SIG-B field is calculated based on the number of User fields in the HE-SIG-B content channel which is indicated by HE-SIG-B common field in this case. If the HE-SIG-B Compression field is set to 1, indicates the number of MU-MIMO users and is set to the number of NU-MIMO users minus 1(#15495). |
| | B22 | SIGB Compression | 1 | Set to 0 if the Common field in HE-SIG-B is present. Set to 1 if the Common field in HE-SIG-B is not present. (#16139) |
| | B23-B24 | GI + LTF Size | 2 | Indicates the GI duration and HE-LTF size: Set to 0 to indicate a 4x HE-LTF and 0.8 µs GI Set to 1 to indicate a 2x HE-LTF and 0.8 µs GI Set to 2 to indicate a 2x HE-LTF and 1.6 µs GI Set to 3 to indicate a 4x HE-LTF and 3.2 µs GI |
| | B25 | Doppler | 1 | Set to 1 if one of the following applies: The number of OFDM symbols in the Data field is larger than the signaled midamble periodicity plus 1 and the midamble is present The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link. Set to 0 otherwise. |
| HE-SIG-A2 | B0-B6 | TXOP | 7 | Set to 127 to indicate no duration information if(#15496) TXVECTOR parameter TXOP_DURATION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8)(#16277). Otherwise, B0 is set to 1 and B1-B6 is set to floor ((TXOP_DURATION - 512 )/128)(#16277). where(#16061) B0 indicates the TXOP length granularity. Set to 0 for 8 µs; otherwise set to 1 for 128 µs. B1-B6 indicates the scaled value of the TXOP_DURATION |
| | B7 | Reserved | 1 | Reserved and set to 1 |
| | B8-B10 | Number of HE-LTF Symbols And Midamble Periodicity | 3 | If the Doppler field is set to 0(#15497), indicates the number of HE-LTF symbols: Set to 0 for 1 HE-LTF symbol Set to 1 for 2 HE-LTF symbols Set to 2 for 4 HE-LTF symbols Set to 3 for 6 HE-LTF symbols Set to 4 for 8 HE-LTF symbols Other values are reserved. If the Doppler field is set to 1(#15498), B8-B9 indicates the number of HE-LTF symbols(#16056) and B10 indicates midamble periodicity: B8-B9 is encoded as follows: 0 indicates 1 HE-LTF symbol 1 indicates 2 HE-LTF symbols 2 indicates 4 HE-LTF symbols 3 is reserved |

TABLE 2-continued

| Two Parts of HE-SIG-A | Bit | Field | Number of bits | Description |
|---|---|---|---|---|
| | | | | B10 is set to 0 if the TXVECTOR parameter MIDAMBLE_PERIODICITY is 10 and set to 1 if the TXVECTOR parameter PREAMBLE_PERIODICITY is 20. |
| | B11 | LDPC Extra Symbol Segment | 1 | Indication of the presence of the extra OFDM symbol segment for LDPC. Set to 1 if an extra OFDM symbol segment for LDPC is present. Set to 0 otherwise. |
| | B12 | STBC | 1 | In an HE MU PPDU where each RU includes no more than 1 user, set to 1 to indicate all RUs are STBC encoded in the payload, set to 0 to indicate all RUs are not STBC encoded in the payload. STBC does not apply to HE-SIG-B. STBC is not applied if one or more RUs are used for MU-MIMO allocation. (#15661) |
| | B13-B14 | Pre-FEC Padding Factor | 2 | Indicates the pre-FEC padding factor. Set to 0 to indicate a pre-FEC padding factor of 4 Set to 1 to indicate a pre-FEC padding factor of 1 Set to 2 to indicate a pre-FEC padding factor of 2 Set to 3 to indicate a pre-FEC padding factor of 3 |
| | B15 | PE Disambiguity | 1 | Indicates PE disambiguity(#16274) as defined in 28.3.12 (Packet extension). |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

In addition, the HE-SIG-A field of the HE TB PPDU may be defined as follows.

TABLE 3

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 0 for an HE TB PPDU |
| | B1-B6 | BSS Color | 6 | The BSS Color field is an identifier of the BSS. Set to the value of the TX VECTOR parameter BSS_COLOR. |
| | B7-B10 | Spatial Reuse 1 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz then this Spatial Reuse field applies to the first 20 MHz subband. If the Bandwidth field indicates 160/80 + 80 MHz then this Spatial Reuse field applies to the first 40 MHz subband of the 160 MHz operating band. Set to the value of the SPATIAL_REUSE(1) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B11-B14 | Spatial Reuse 2 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz: |

TABLE 3-continued

| Two Parts of HE-SIG-A | Bit | Field | Number of bits | Description |
|---|---|---|---|---|
| | | | | This Spatial Reuse field applies to the second 20 MHz subband.
If(#Ed) the STA operating channel width is 20 MHz, then this field is set to the same value as Spatial Reuse 1 field.
If(#Ed) the STA operating channel width is 40 MHz in the 2.4 GHz band, this field is set to the same value as Spatial Reuse 1 field.
If the Bandwidth field indicates 160/80 + 80 MHz the this Spatial Reuse field applies to the second 40 MHz subband of the 160 MHz operating band.
Set to the value of the SPATIAL_REUSE(2) parameter of the TXVECTOR, which contains a value from Table 28-22 (Spatial Reuse field encoding for an HE TB PPDU) for an HE TB PPDU (see 27.11.6 (SPATIAL_REUSE)).
Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmission.
If the Bandwidth field indicates 20 MHz, 40 MHz or 80 MHz:
This Spatial Reuse field applies to the third 20 MHz subband.
If(#Ed) the STA operating channel width is 20 MHz or 40 MHz, this field is set to the same value as Spatial Reuse 1 field.
If the Bandwidth field indicates 160/80 + 80 MHz:
This Spatial Reuse field applies to the third 40 MHz subband of the 160 MHz operating band.
If(#Ed) the STA operating channel width is 80 + 80 MHz, this field is set to the same value as Spatial Reuse 1 field.
Set to the value of the SPATIAL_REIJSE(3) parameter of the TXVECTOR, which contains a value from Table 28-22 (Spatial Reuse field encoding for an HE TB PPDU) for an HE TB PPDU (see 27.11.6 (SPATIAL_REUSE)).
Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B22 | Spatial Reuse 4 | 4 | Indicates whether or not spatial reuse is allowed in a subband of the PPDU during the transmission of this PPDU, and if allowed, indicates a value that is used to determine a limit on the transmit power of a spatial reuse transmission.
If the Bandwidth field indicates 20 MHz, 40 MHz or 80 MHz:
This Spatial Reuse field applies to the fourth 20 MHz subband.
If(#Ed) the STA operating channel width is 20 MHz, then this field is set to the same value as Spatial Reuse 1 field.
If(#Ed) the STA operating channel width is 40 MHz, then this field is set to the same value as Spatial Reuse 2 field.
If the Bandwidth field indicates 160/80 + 80 MHz:
This Spatial Reuse field applies to the fourth 40 MHz subband of the 160 MHz operating band.
If (#Ed) the STA operating channel width is 80 + 80 MHz, then this field is set to same value as Spatial Reuse 2 field. |

TABLE 3-continued

| Two Parts of HE-SIG-A | Bit | Field | Number of bits | Description |
|---|---|---|---|---|
| | | | | Set to the value of the SPATIAL_REUSE(4) parameter of the TXVECTOR, which contains a value from Table 28-22 (Spatial Reuse field encoding for an HE TB PPDU) for an HE TB PPDU (see 27.11.6 (SPATIAL REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B23 | Reserved | 1 | Reserved and set to 1. NOTE-Unlike other Reserved fields in HE-SIG-A of the HE TB PPDU, B23 does not have a corresponding bit in the Trigger frame. |
| | B24-B25 | Bandwidth | 2 | (#16003)Set to 0 for 20 MHz Set to 1 for 40 MHz Set to 2 for 80 MHz Set to 3 for 160 MHz and 80 + 80 MHz |
| HE-SIG-A2 | B0-B6 | TXOP | 7 | Set to 127 to indicate no duration information if(#15499) TXVECTOR parameter TXOP_DURATION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8)(16277). Otherwise, B0 is set to 1 and B1-B6 is set to floor ((TXOP_DURATION-512)/128)(16277). where(16061) B0 indicates the TXOP length granularity. Set to (0 for 8 μs; otherwise set to 1 for 128 μs. B1-B6 indicates the scaled value of the TXOP_DURATION |
| | B7-B15 | Reserved | 9 | Reserved and set to value indicated in the UL HE-SIG-A2 Reserved subfield in the Trigger frame. |
| | B16-B19 | CRC | 4 | CRC of bits 0-41 of the HE-SIG-A field. See 28.3.10.7.3 (CRC computation). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

An HE-SIG-B (740) may be included only in the case of the PPDU for the multiple users (MUs) as described above. Principally, an HE-SIG-A (750) or an HE-SIG-B (760) may include resource allocation information (alternatively, virtual resource allocation information) for at least one receiving STA.

Figure 8:
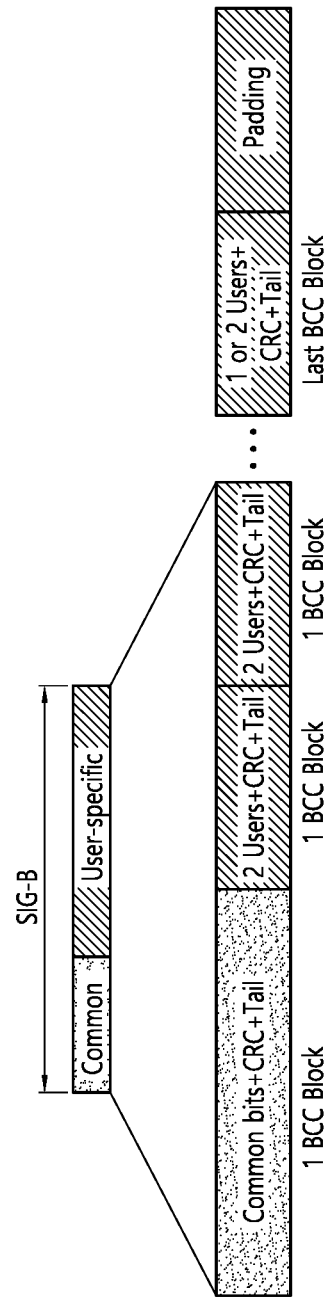
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B (740) may be transmitted in a duplicated form on a MU PPDU. In the case of the HE-SIG-B (740), the HE-SIG-B (740) transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B (740) in a specific frequency band (e.g., the second frequency band) is duplicated with the HE-SIG-B (740) of another frequency band (e.g., the fourth frequency band). Alternatively, the HE-SIG B (740) may be transmitted in an encoded form on all transmission resources. A field after the HE-SIG B (740) may include individual information for respective receiving STAs receiving the PPDU.

The HE-STF (750) may be used for improving automatic gain control estimation in a multiple input multiple output (MIMO) environment or an OFDMA environment.

The HE-LTF (760) may be used for estimating a channel in the MIMO environment or the OFDMA environment.

The size of fast Fourier transform (FFT)/inverse fast Fourier transform (IFFT) applied to the HE-STF (750) and the field after the HE-STF (750), and the size of the FFT/IFFT applied to the field before the HE-STF (750) may be different from each other. For example, the size of FFT/IFFT applied to the HE-STF (750) and the field after the HE-STF (750) may be four times larger than the size of the FFT/IFFT applied to the field before the HE-STF (750).

For example, when at least one field of the L-STF (700), the L-LTF (710), the L-SIG (720), the HE-SIG-A (730), and the HE-SIG-B (740) on the PPDU of FIG. 7 is referred to as a first field, at least one of the data field (770), the HE-STF (750), and the HE-LTF (760) may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 us and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A (730) and may be instructed to receive the downlink PPDU based on the HE-SIG-A (730). In this case, the STA may perform decoding based on the FFT size changed from the HE-STF (750) and the field after the HE-STF (750). On the contrary, when the STA may not be instructed to receive the downlink PPDU based on the HE-SIG-A (730), the STA may stop the decoding and configure a network allocation vector (NAV). A cyclic prefix (CP) of the HE-STF (750) may have a larger size than the CP of another field and the during the CP period, the STA may perform the decoding for the downlink PPDU by changing the FFT size.

Hereinafter, in the embodiment of the present disclosure, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the total bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, subchannels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, subchannel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, subchannels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, subchannel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBS S is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 9:
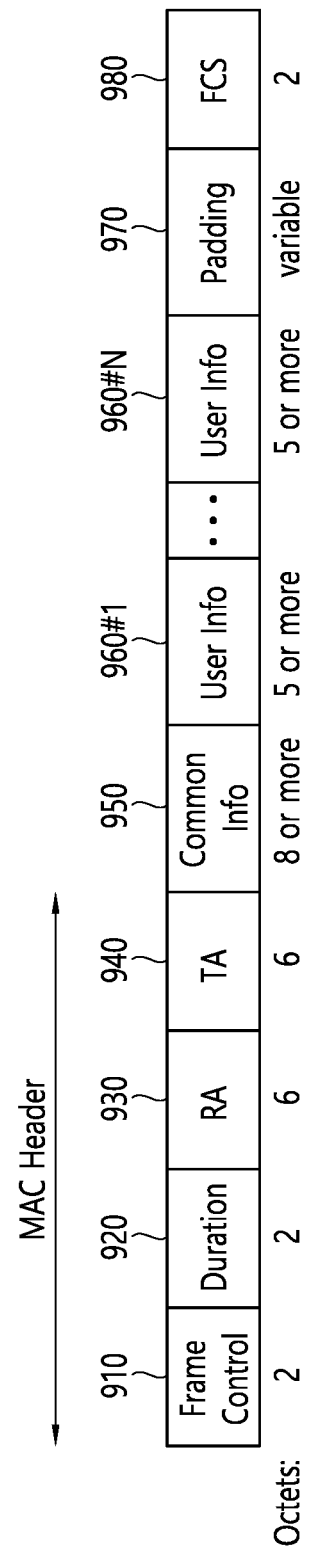
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field (910) shown in FIG. 9 may include information related to a version of the MAC protocol and other additional control information, and a Duration field (920) may include time information for configuring a NAV or information related to an identifier (e.g., AID) of the user equipment.

Also, the RA field (930) includes address information of a receiving STA of the corresponding trigger frame and may be omitted if necessary. The TA field (940) includes address information of an STA triggering the corresponding trigger frame (for example, an AP), and the common information field (950) includes common control information applied to a receiving STA that receives the corresponding trigger frame. For example, a field indicating the length of the L-SIG field of the UL PPDU transmitted in response to the corresponding trigger frame or information controlling the content of the SIG-A field (namely, the HE-SIG-A field) of the UL PPDU transmitted in response to the corresponding trigger frame may be included. Also, as common control information, information on the length of the CP of the UP PPDU transmitted in response to the corresponding trigger frame or information on the length of the LTF field may be included.

Also, it is preferable to include a per user information field (960 #1 to 960 #N) corresponding to the number of receiving STAs that receive the trigger frame of FIG. 9. The per user information field may be referred to as an "RU allocation field".

Also, the trigger frame of FIG. 9 may include a padding field (970) and a frame check sequence field (980).

It is preferable that each of the per user information fields (960 #1 to 960 #N) shown in FIG. 9 includes a plurality of subfields.

Figure 10:
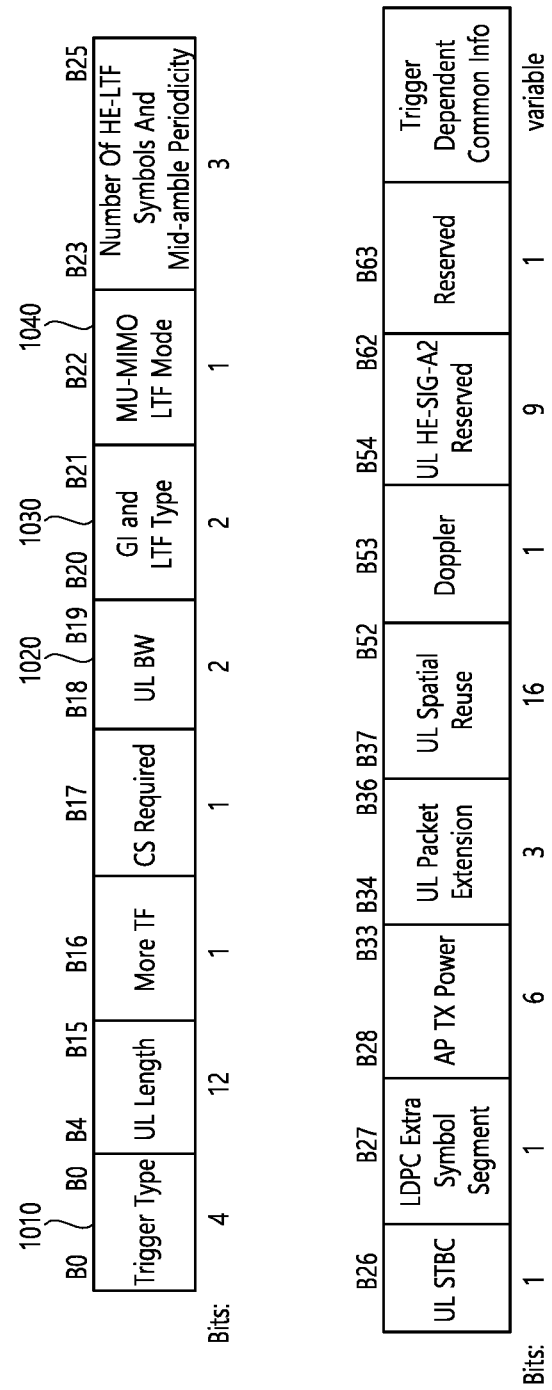
FIG. 10 illustrates an example of a common information field.

FIG. 10 illustrates an example of a common information field. Among the subfields of FIG. 10, some may be omitted, and other additional subfields may also be added. Additionally, the length of each of the subfields shown in the drawing may be varied.

The trigger type field (1010) of FIG. 10 may indicate a trigger frame variant and encoding of the trigger frame variant. The trigger type field (1010) may be defined as follows.

TABLE 4

| Trigger Type subfield value | Trigger frame variant |
| --- | --- |
| 0 | Basic |
| 1 | Beamforming Report Poll (BFRP) |
| 2 | MU-BAR |
| 1 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

The UL BW field (1020) of FIG. 10 indicates bandwidth in the HE-SIG-A field of an HE Trigger Based (TB) PPDU. The UL BW field (1020) may be defined as follows.

TABLE 5

| UL BW subfield value | Description |
| --- | --- |
| 0 | 20 MHz |
| 1 | 40 MHz |
| 2 | 80 MHz |
| 3 | 80 + 80 MHz or 160 MHz |

The Guard Interval (GI) and LTF type fields (1030) of FIG. 10 indicate the GI and HE-LTF type of the HE TB PPDU response. The GI and LTF type field (1030) may be defined as follows.

TABLE 6

| GI And LTF field value | Description |
| --- | --- |
| 0 | 1× HE-LTF + 1.6 μs GI |
| 1 | 2× HE-LTF + 1.6 μs GI |
| 2 | 4× HE-LTF + 3.2 μs GI(#15968) |
| 3 | Reserved |

Also, when the GI and LTF type fields (1030) have a value of 2 or 3, the MU-MIMO LTF mode field (1040) of FIG. 10 indicates the LTF mode of a UL MU-MIMO HE TB PPDU response. At this time, the MU-MIMO LTF mode field (1040) may be defined as follows.

If the trigger frame allocates an RU that occupies the whole HE TB PPDU bandwidth and the RU is allocated to one or more STAs, the MU-MIMO LTF mode field (1040) indicates one of an HE single stream pilot HE-LTF mode or an HE masked HE-LTF sequence mode.

If the trigger frame does not allocate an RU that occupies the whole HE TB PPDU bandwidth and the RU is not allocated to one or more STAs, the MU-MIMO LTF mode field (1040) indicates the HE single stream pilot HE-LTF mode. The MU-MIMO LTF mode field (1040) may be defined as follows.

TABLE 7

| MU-MIMO LTF subfield value | Description |
| --- | --- |
| 0 | HE single stream pilot HE-LTF mode |
| 1 | HE masked HE-LTF sequence mode |

Figure 11:
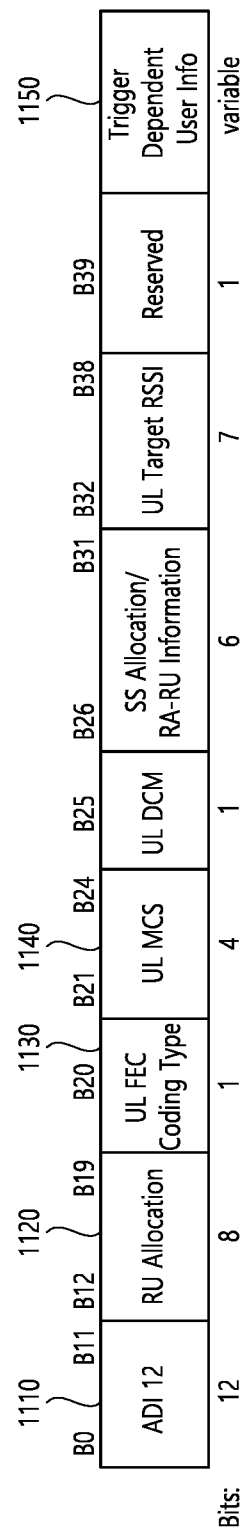
FIG. 11 illustrates an example of a sub-field being included in a per user information field.

FIG. 11 illustrates an example of a subfield being included in a per user information field. Among the subfields of FIG. 11, some may be omitted, and other additional subfields may also be added. Additionally, the length of each of the subfields shown in the drawing may be varied.

The User Identifier field of FIG. 11 (or AID12 field, 1110) indicates the identifier of an STA (namely, a receiving STA) corresponding to per user information, where an example of the identifier may be the whole or part of the AID.

Also, an RU Allocation field (1120) may be included. In other words, when a receiving STA identified by the User Identifier field (1110) transmits a UL PPDU in response to the trigger frame of FIG. 9, the corresponding UL PPDU is transmitted through an RU indicated by the RU Allocation field (1120). In this case, it is preferable that the RU indicated by the RU Allocation field (1120) indicates the RUs shown in FIGS. 4, 5, and 6. A specific structure of the RU Allocation field (1120) will be described later.

The subfield of FIG. 11 may include a (UL FEC) coding type field (1130). The coding type field (1130) may indicate the coding type of an uplink PPDU transmitted in response to the trigger frame of FIG. 9. For example, when BCC coding is applied to the uplink PPDU, the coding type field (1130) may be set to '1', and when LDPC coding is applied, the coding type field (1130) may be set to '0'.

Additionally, the subfield of FIG. 11 may include a UL MCS field (1140). The MCS field (1140) may indicate an MCS scheme being applied to the uplink PPDU that is transmitted in response to the trigger frame of FIG. 9.

Also, the subfield of FIG. 11 may include a Trigger Dependent User Info field (1150). When the Trigger Type field (1010) of FIG. 10 indicates a basic trigger variant, the Trigger Dependent User Info field (1150) may include an MPDU MU Spacing Factor subfield (2 bits), a TID Aggregate Limit subfield (3 bits), a Reserved field (1 bit), and a Preferred AC subfield (2 bits).

Hereinafter, the present disclosure proposes an example of improving a control field included in a PPDU. The control field improved according to the present disclosure includes a first control field including control information required to interpret the PPDU and a second control field including control information for demodulate the data field of the PPDU. The first and second control fields may be used for various fields. For example, the first control field may be the HE-SIG-A (730) of FIG. 7, and the second control field may be the HE-SIG-B (740) shown in FIGS. 7 and 8.

Hereinafter, a specific example of improving the first or the second control field will be described.

In the following example, a control identifier inserted to the first control field or a second control field is proposed. The size of the control identifier may vary, which, for example, may be implemented with 1-bit information.

The control identifier (for example, a 1-bit identifier) may indicate whether a 242-type RU is allocated when, for example, 20 MHz transmission is performed. As shown in FIGS. 4 to 6, RUs of various sizes may be used. These RUs may be divided broadly into two types. For example, all of the RUs shown in FIGS. 4 to 6 may be classified into 26-type RUs and 242-type RUs. For example, a 26-type RU may include a 26-RU, a 52-RU, and a 106-RU while a 242-type RU may include a 242-RU, a 484-RU, and a larger RU.

The control identifier (for example, a 1-bit identifier) may indicate that a 242-type RU has been used. In other words, the control identifier may indicate that a 242-RU, a 484-RU, or a 996-RU is included. If the transmission frequency band in which a PPDU is transmitted has a bandwidth of 20 MHz, a 242-RU is a single RU corresponding to the full bandwidth of the transmission frequency band (namely, 20 MHz). Accordingly, the control identifier (for example, 1-bit identifier) may indicate whether a single RU corresponding to the full bandwidth of the transmission frequency band is allocated.

For example, if the transmission frequency band has a bandwidth of 40 MHz, the control identifier (for example, a 1-bit identifier) may indicate whether a single RU corresponding to the full bandwidth (namely, bandwidth of 40 MHz) of the transmission frequency band has been allocated. In other words, the control identifier may indicate whether a 484-RU has been allocated for transmission in the frequency band with a bandwidth of 40 MHz.

For example, if the transmission frequency band has a bandwidth of 80 MHz, the control identifier (for example, a 1-bit identifier) may indicate whether a single RU corresponding to the full bandwidth (namely, bandwidth of 80 MHz) of the transmission frequency band has been allocated. In other words, the control identifier may indicate whether a 996-RU has been allocated for transmission in the frequency band with a bandwidth of 80 MHz.

Various technical effects may be achieved through the control identifier (for example, 1-bit identifier).

First of all, when a single RU corresponding to the full bandwidth of the transmission frequency band is allocated through the control identifier (for example, a 1-bit identifier), allocation information of the RU may be omitted. In other words, since only one RU rather than a plurality of RUs is allocated over the whole transmission frequency band, allocation information of the RU may be omitted deliberately.

Also, the control identifier may be used as signaling for full bandwidth MU-MIMO. For example, when a single RU is allocated over the full bandwidth of the transmission frequency band, multiple users may be allocated to the corresponding single RU. In other words, even though signals for each user are not distinctive in the temporal and spatial domains, other techniques (for example, spatial multiplexing) may be used to multiplex the signals for multiple users in the same, single RU. Accordingly, the control identifier (for example, a 1-bit identifier) may also be used to indicate whether to use the full bandwidth MU-MIMO described above.

The common field included in the second control field (HE-SIG-B, 740) may include an RU allocation subfield. According to the PPDU bandwidth, the common field may include a plurality of RU allocation subfields (including N RU allocation subfields). The format of the common field may be defined as follows.

TABLE 8

| Subfield | Number of bits | Description |
| --- | --- | --- |
| RU Allocation | N × 8 | Indicates the RU assignment to be used in the data portion in the frequency domain. It also indicates the number of users in each RU. For RUs of size greater than or equal to 106-tones that support MU-MIMO, it indicates the number of users multiplexed using MU-MIMO.<br>Consists of N RU Allocation subfields:<br>N = 1 for a 20 MHz and a 40 MHz HE MU PPDU<br>N = 2 for an 80 MHz HE MU PPDU<br>N = 4 for a 160 MHz or 80 + 80 MHz HE MU PPDU |
| Center 26-tone RU | 1 | This field is present only if(#15510) the value of the Bandwidth field of HE-SIG-A field in an HE MU PPDU is set to greater than 1.<br>If the Bandwidth field of the HE-SIG-A field in all HE MU PPDU is set to 2, 4 or 5 for 80 MHz:<br>Set to 1 to indicate that a user is allocated to the center 26-tone RU (see FIG. 28-7 (RU locations in an 80 MHz HE PPDU(#16528))); otherwise, set to 0. The same value is applied to both HE-SIG-B content channels.<br>If the Bandwidth field of the HE-SIG-A field in an HE MU PPDU is set to 3, 6 or 7 for 160 MHz or 80 + 80 MHz:<br>For HE-SIG-B content channel 1, set to 1 to indicate that a user is allocated to the center 26-tone RU of the lower frequency 80 MHz; otherwise, set to 0.<br>For HE-SIG-B content channel 2, set to 1 to indicate that a user is allocated to the center 26-tone RU of the higher frequency 80 MHz; otherwise, set to 0. |
| CRC | 4 | See 28.3.10.7.3 (CRC computation) |
| Tail | 6 | Used to terminate the trellis of the convolutional decoder. Set to 0 |

The RU allocation subfield included in the common field of the HE-SIG-B may be configured with 8 bits and may indicate as follows with respect to 20 MHz PPDU bandwidth. RUs to be used as a data portion in the frequency domain are allocated using an index for RU size and disposition in the frequency domain. The mapping between an 8-bit RU allocation subfield for RU allocation and the number of users per RU may be defined as follows.

TABLE 9

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 |    | 52 | 1 |
| 00000010 | 26 | 26 | 26 | 26 | 26 |    | 52 | 26 | 26 | 1 |
| 00000011 | 26 | 26 | 26 | 26 | 26 |    | 52 |    | 52 | 1 |
| 00000100 | 26 | 26 | 26 | 52 | 26 | 26 | 26 | 26 | 26 | 1 |
| 00000101 | 26 | 26 | 26 | 52 | 26 | 26 | 26 |    | 52 | 1 |
| 00000110 | 26 | 26 | 26 | 52 | 26 |    | 52 | 26 | 26 | 1 |
| 00000111 | 26 | 26 | 26 | 52 | 26 |    | 52 |    | 52 | 1 |
| 00001000 |    | 52 | 26 | 26 | 26 | 26 | 26 | 26 | 26 | 1 |
| 00001001 |    | 52 | 26 | 26 | 26 | 26 | 26 |    | 52 | 1 |
| 00001010 |    | 52 | 26 | 26 | 26 | 52 | 26 | 26 |    | 1 |
| 00001011 |    | 52 | 26 | 26 | 26 |    | 52 |    | 52 | 1 |
| 00001100 |    | 52 |    | 52 | 26 | 26 | 26 | 26 | 26 | 1 |
| 00001101 |    | 52 |    | 52 | 26 | 26 | 26 |    | 52 | 1 |
| 00001110 |    | 52 |    | 52 | 26 | 52 | 26 | 26 |    | 1 |
| 00001111 |    | 52 |    | 52 | 26 |    | 52 |    | 52 | 1 |
| 0001 $y_2y_1y_0$ |    | 52 |    | 52 | — |    | 106 |    |    | 8 |
| 00011 $y_2y_1y_0$ |    |    | 106 |    | — |    | 52 |    | 52 | 8 |
| 00100 $y_2y_1y_0$ | 26 | 26 | 26 | 26 | 26 |    | 106 |    |    | 8 |
| 00101 $y_2y_1y_0$ | 26 | 26 |    | 52 | 26 |    | 106 |    |    | 8 |
| 00110 $y_2y_1y_0$ |    | 52 | 26 | 26 | 26 |    | 106 |    |    | 8 |
| 00111 $y_2y_1y_0$ |    | 52 |    | 52 | 26 |    | 106 |    |    | 8 |
| 01000 $y_2y_1y_0$ |    |    | 106 |    | 26 | 26 | 26 | 26 | 26 | 8 |
| 01001 $y_2y_1y_0$ |    |    | 106 |    | 26 | 26 | 26 |    | 52 | 8 |
| 01010 $y_2y_1y_0$ |    |    | 106 |    | 26 | 52 | 26 | 26 |    | 8 |
| 01011 $y_2y_1y_0$ |    |    | 106 |    | 26 |    | 52 |    | 52 | 8 |
| 0110 $y_1y_0z_1z_0$ |    |    | 106 |    | — |    | 106 |    |    | 16 |
| 01110000 |    | 52 |    | 52 |    |    | 52 |    | 52 | 1 |
| 01110001 | 242-tone RU empty | | | | | | | | | 1 |
| 01110010 | 484-tone RU with zero User fields indicated in this RU Allocation subfield of the HE-SIG-B content channel | | | | | | | | | 1 |
| 01110011 | 996-tone RU with zero User fields indicated in this RU Allocation subfield of the HE-SIG-13 content channel | | | | | | | | | 1 |
| 011101 $x_1x_0$ | Reserved | | | | | | | | | 4 |
| 01111 $y_2y_1y_0$ | Reserved | | | | | | | | | 8 |
| 10 $y_2y_1y_0z_2z_1z_0$ |    |    | 106 |    | 26 |    | 106 |    |    | 64 |
| 11000 $y_2y_1y_0$ |    |    |    |    | 242 |    |    |    |    | 8 |
| 11001 $y_2y_1y_0$ |    |    |    |    | 484 |    |    |    |    | 8 |
| 11010 $y_2y_1y_0$ |    |    |    |    | 996 |    |    |    |    | 8 |
| 11011 $y_2y_1y_0$ | Reserved | | | | | | | | | 8 |
| 111 $x_4x_3x_2x_1x_0$ | Reserved | | | | | | | | | 32 |

If(#Rd) signaling RUs of size greater than 242 subcarriers, $y_2y_1y_0$ = 000-111 indicates number of User fields in the HE-SIG-B content channel that contains the corresponding 8-bit RU Allocation subfield. Otherwise, $y_2y_1y_0$ = 000-111 indicates number of STAs multiplexed in the 106-tone RU, 242-tone RU or the lower frequency 106-tone RU if there are two 106-tone RUs and one 26-tone RU is assigned between two 106-tone RUs. The binary vector $y_2y_1y_0$ indicates $2^2 \times y_2 + 2^1 \times y_1 + y_0 + 1$ STAs multiplexed the RU.
$z_2z_1z_0$ = 000-111 indicates number of STAs multiplexed in the higher frequency 106-tone RU if there are two 106-tone RUs and one 26-tone RU is assigned between two 106-tone RUs. The binary vector $z_2z_1z_0$ indicates $2^2 \times z_2 + 2^1 \times z_1 + z_0 + 1$ STAs multiplexed in the RU.
Similarly, $y_1y_0$ = 00-11 indicates number of STAs multiplexed in the lower frequency 106-tone RU. The binary vector $y_1y_0$ indicates $2^1 \times y_1 + y_0 + 1$ STAs multiplexed in the RU.
Similarly, $z_1z_0$ = 00-11 indicates the number of STAs multiplexed in the higher frequency 106-tone RU. The binary vector $z_1z_0$ indicates $2^1 \times z_1 + z_0 + 1$ STAs multiplexed in the RU.
1 to #9 (from left to the right) is ordered in increasing order of the absolute frequency.
$x_1x_0$ = 00-11, $x_4x_3x_2x_1x_0$ = 00000-11111.
'—' means no STA in that RU.

The user-specific field included in the second control field (HE-SIG-B, 740) may include a user field, a CRC field, and a Tail field. The format of the user-specific field may be defined as follows.

TABLE 10

| Subfield | Number of bits | Description |
|---|---|---|
| User field | N × 21 | The User field format for a non-MU-MIMO allocation is defined in Table 28-26 (User field format for a non-MU-MIMO allocation). The User field format for a MU-MIMO allocation is defined in Table 28-27 (User field for an MU-MIMO allocation). |

TABLE 10-continued

| Subfield | Number of bits | Description |
|---|---|---|
|  |  | N = 1 if it is the last User Block field, and if there is only one user in the last User Block field. N = 2 otherwise. |
| CRC | 4 | The CRC is calculated over bits 0 to 20 for a User Block field that contains one User field, and bits 0 to 41 for a User Block field that contains two User fields. See 28.3.10.7.3 (CRC computation). |
| Tail | 6 | Used to terminate the trellis of the convolutional decoder. Set to 0. |

Also, the user-specific field of the HE-SIG-B is composed of a plurality of user fields. The plurality of user fields are located after the common field of the HE-SIG-B. The location of the RU allocation subfield of the common field and that of the user field of the user-specific field are used together to identify an RU used for transmitting data of an STA. A plurality of RUs designated as a single STA are now allowed in the user-specific field. Therefore, signaling that allows an STA to decode its own data is transmitted only in one user field.

As an example, it may be assumed that the RU allocation subfield is configured with 8 bits of 01000010 to indicate that five 26-tone RUs are arranged next to one 106-tone RU and three user fields are included in the 106-tone RU. At this time, the 106-tone RU may support multiplexing of the three users. This example may indicate that eight user fields included in the user-specific field are mapped to six RUs, the first three user fields are allocated according to the MU-MIMO scheme in the first 106-tone RU, and the remaining five user fields are allocated to each of the five 26-tone RUs.

User fields included in the user-specific field of the HE-SIG-B may be defined as described below. Firstly, user fields for non-MU-MIMO allocation are as described below.

TABLE 12

| Bit | Subfield | Number of bits | Description |
|---|---|---|---|
| B0-B10 | STA-ID | 11 | Set to a value of the element indicated from TXVECTOR parameter STA_ID_LIST (see 27.11.1 (STA_ID_LIST)). |
| B11-B13 | NSTS | 3 | Number of space-time streams. Set to the number of space-time streams minus 1. |
| B14 | Beam-formed (#16038) | 1 | Use of transmit beamforming. Set to 1 if a beamforming steering matrix is applied to the waveform in an SU transmission. Set to 0 otherwise. |
| B15-B18 | MCS | 4 | Modulation and coding scheme Set to n for MCSn, where n = 0, 1, 2 . . . , 11 Values 12 to 15 are reserved |
| B19 | DCM | 1 | Indicates whether or not DCM is used. Set to 1 to indicate that the payload(#Ed) of the corresponding user of the HE MU PPDU is modulated with DCM for the MCS. Set to 0 to indicate that the payload of the corresponding user of the PPDU is not modulated with DCM for the MCS. NOTE-DCM is not applied in combination with STBC.(#15664) |
| B20 | Coding | 1 | Indicates whether BCC or LDPC is used. Set to 0 for BCC Set to 1 for LDPC |

NOTE-
If the STA-ID subfield is set to 2046, then the other subfields can be set to arbitrary values.(#15946)

User fields for MU-MIMO allocation are as described below.

TABLE 13

| Bit | Subfield | Number of bits | Description |
|---|---|---|---|
| B0-B10 | STA-ID | 11 | Set to a value of element indicated from TXVECTOR parameter STA_ID_LIST (see 27.11.1 (STA_ID_LIST)). |
| B11-B14 | Spatial Configuration | 4 | Indicates the number of spatial streams for a STA in an MU-MIMO allocation (see Table 28-28 (Spatial Configuration subfield encoding)). |
| B15-B18 | MCS | 4 | Modulation and coding scheme. Set to n for MCSn where n = 0, 1, 2, . . . , 11 Values 12 to 15 are reserved |
| B19 | Reserved | 1 | Reserved and set to 0 |
| B20 | Coding | 1 | Indicates whether BCC or LDPC is used. Set to 0 for BCC Set to 1 for LDPC |

NOTE-
If the STA-ID subfeld is set to 2046, then the other subfields can be set to arbitrary values.(#15946)

Figure 12:
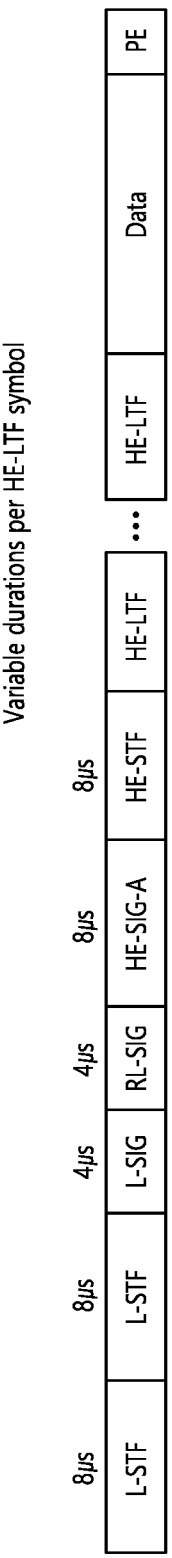
FIG. 12 illustrates an example of an HE TB PPDU.

FIG. 12 illustrates an example of an HE TB PPDU. The PPDU of FIG. 12 illustrates an uplink PPDU transmitted in response to the trigger frame of FIG. 9. At least one STA receiving a trigger frame from an AP may check the common information field and the individual user information field of the trigger frame and may transmit a HE TB PPDU simultaneously with another STA which has received the trigger frame.

As shown in the figure, the PPDU of FIG. 12 includes various fields, each of which corresponds to the field shown in FIG. 2, FIG. 3, and FIG. 7. Meanwhile, as shown in the figure, the HE TB PPDU (or uplink PPDU) of FIG. 12 may not include the HE-SIG-B field but only the HE-SIG-A field.

1. CSMA/CA (Carrier Sense Multiple Access/Collision Avoidance)

In IEEE 802.11, communication is achieved in a shared wireless medium, and thus has a characteristic fundamentally different from a wired channel environment. For example, communication is possible based on carrier sense multiple access/collision detection (CSMA/CD) in the wired channel environment For example, when a signal is transmitted one time in Tx, the signal is transmitted to Rx without significant signal attenuation since a channel environment does not change much. In this case, when a collision occurs in two or more signals, it is detectable. This is because power detected in Rx is instantaneously greater than power transmitted in Tx. However, in a wireless channel environment, a channel is affected by various factors (e.g., a signal may be significantly attenuated according to a distance or may instantaneously experience deep fading), carrier sensing cannot be achieved correctly in Tx as to whether a signal is properly transmitted in Rx in practice or whether a collision exists. Therefore, a distributed coordination function (DCF) which is a carrier sense multiple access/collision avoidance (CSMA/CA) mechanism is introduced in 802.11. Herein, stations (STAs) having data to be transmitted perform clear channel assessment (CCA) for sensing a medium during a specific duration (e.g., DIFS: DCF inter-frame space) before transmitting the data. In this case, if the medium is idle, the STA can transmit the data by using the medium. On the other hand, if the medium is busy, under the assumption that several STAs have already waited for the use of the medium, the data can be transmitted after waiting by a random backoff period in addition to the DIFS. In this case, the random backoff period can allow the collision to be avoidable because, under the assumption that there are several STAs for transmitting data, each STA has a different backoff interval probabilistically and thus eventually has a different transmission time. When one STA starts transmission, the other STAs cannot use the medium.

The random backoff time and the procedure will be simply described as follows. When a specific medium transitions from busy to idle, several STAs start a preparation for data transmission. In this case, to minimize a collision, the STAs intending to transmit the data select respective random backoff counts and wait by those slot times. The random backoff count is a pseudo-random integer value, and one of uniform distribution values is selected in the range of [0 CW]. Herein, CW denotes a contention window. A CW parameter takes a CWmin value as an initial value, and when transmission fails, the value is doubled. For example, if an ACK response is not received in response to a transmitted data frame, it may be regarded that a collision occurs. If the CW value has a CWmax value, the CWmax value is maintained until data transmission is successful, and when the data transmission is successful, is reset to the CWmin value. In this case, the values CW, CWmin, and CWmax are preferably maintained to $2^n-1$ for convenience of implementations and operations. Meanwhile, if the random backoff procedure starts, the STA selects the random backoff count in the [0 CW] range and thereafter continuously monitors a medium while counting down a backoff slot. In the meantime, if the medium enters a busy state, the countdown is stopped, and when the medium returns to an idle state, the countdown of the remaining backoff slots is resumed.

2. PHY Procedure

A PHY transmit/receive procedure in Wi-Fi is as follows, but a specific packet configuration method may differ. For convenience, only 11n and 11ax will be taken for example, but 11g/ac also conforms to a similar procedure.

That is, in the PHY transmit procedure, a MAC protocol data unit (MPDU) or an aggregate MPDU (A-MPDU) transmitted from a MAC end is converted into a single PHY service data unit (PSDU) in a PHY end, and is transmitted by inserting a preamble, tail bits, and padding bits (optional), and this is called a PPDU.

The PHY receive procedure is usually as follows. When performing energy detection and preamble detection (L/HT/VHT/HE-preamble detection for each WiFi version), information on a PSDU configuration is obtained from a PHY header (L/HT/VHT/HE-SIG) to read a MAC header, and then data is read.

3. Multi-Band (or Multi-Link) Aggregation

In order to increase a peak throughput, transmission of an increased stream is considered in a WLAN 802.11 system by using a wider band or more antennas compared to the legacy 11a. In addition, a method of using various bands by aggregating the bands is also considered.

The present specification proposes a scheme of transmitting data of HE STAs and HE STAs simultaneously by using the same MU PPDU in a situation of considering a wide bandwidth, a multi-band (or multi-link) aggregation, or the like.

Figure 13:
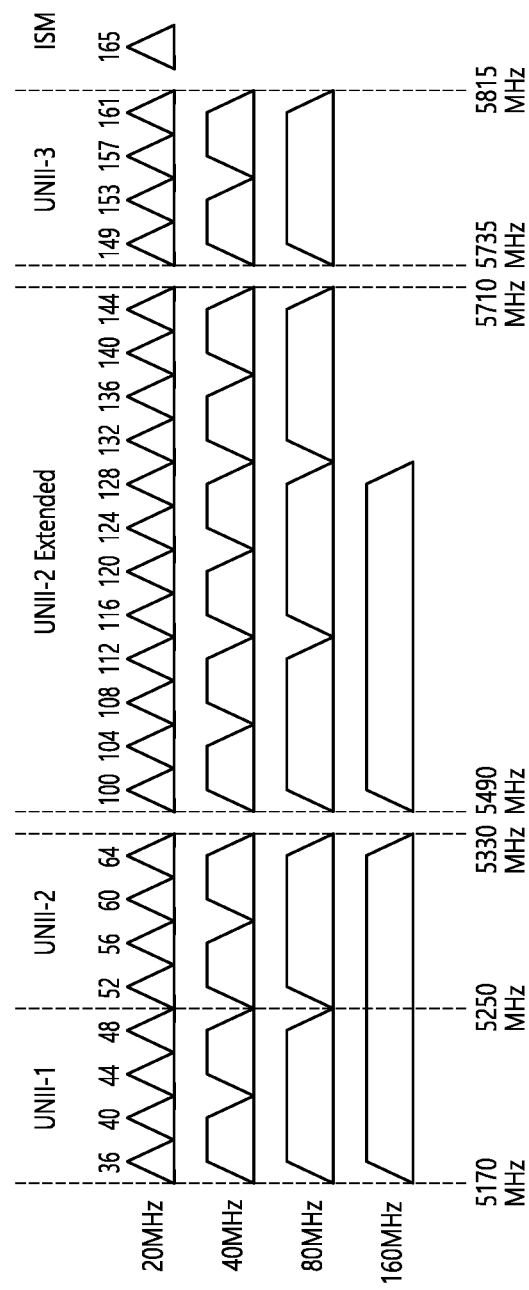
FIG. 13 illustrates multiple channels allocated in a 5 GHz band.

FIG. 13 illustrates multiple channels allocated in a 5 GHz band.

Hereinafter, a "band" may include, for example, 2.4 GHz, 5 GHz, and 6 GHz bands.

For example, the 2.4 GHz band and the 5 GHz band are supported in the 11n standard, and up to the 6 GHz band is supported in the 1 lax standard. For example, in the 5 GHz band, multiple channels may be defined as shown in FIG. 13.

The WLAN system to which technical features of the present specification are applied may support a multi-band. That is, a transmitting STA can transmit a PPDU through any channel (e.g., 20/40/80/80+80/160/240/320 MHz, etc.) on a second band (e.g., 6 GHz) while transmitting the PPDU through any channel (e.g., 20/40/80/80+80/160 MHz, etc.) on a first band (e.g., 5 GHz) (In the present specification, a 240 MHz channel may be a continuous 240 MHz channel or a combination of discontinuous 80/160 MHz channels. Further, a 320 MHz channel may be a continuous 320 MHz channel or a combination of discontinuous 80/160 MHz channels. For example, in the present document, the 20 MHz channel may be a continuous 240 MHz channel, an 80+80+80 MHz channel, or an 80+160 MHz channel).

In addition, the multi-band described in the present document can be interpreted in various meanings. For example, the transmitting STA may set any one of 20/40/80/80+80/ 160/240/320 MHz channels on the 6 GHz band to the first band, set any one of other 20/40/80/80+80/160/240/320 MHz channels on the 6 GHz band to the second band, and may perform multi-band transmission (i.e., transmission simultaneously supporting the first band and the second band). For example, the transmitting STA may transmit the PPDU simultaneously through the first band and the second band, and may transmit it through only any one of the bands at a specific timing.

At least any one of primary 20 MHz and secondary 20/40/80/160 MHz channels described below may be transmitted in the first band, and the remaining channels may be transmitted in the second band. Alternatively, all channels may be transmitted in the same one band.

In the present specification, the term "band" may be replaced with "link".

Next, a control signaling method for multi-band aggregation will be described. Since the control signaling method may employ a fast session transfer (FST) setup method, an FST setup protocol will be described below.

The FST setup protocol consists of four states and a rule for a method of transitioning from one state to a next state. The four states are Initial, Setup Completed, Transition Done, and Transition Confirmed. In the Initial state, an FST session operates in one or two bands/channels. In the Setup Complete state, an initiator and a responder are ready to change band/channel(s) currently operating. The FST session may be transferred entirely or partially to another band/channel. The Transition Done state allows the initiator and responder to operate in different bands/channels when a value of link loss timeout (LLT) is 0. Both the initiator and the responder shall communicate successfully in a new band/channel to reach the Transition Confirmed state. A state transition diagram of the FST setup protocol is shown in FIG. 14.

Figure 14:
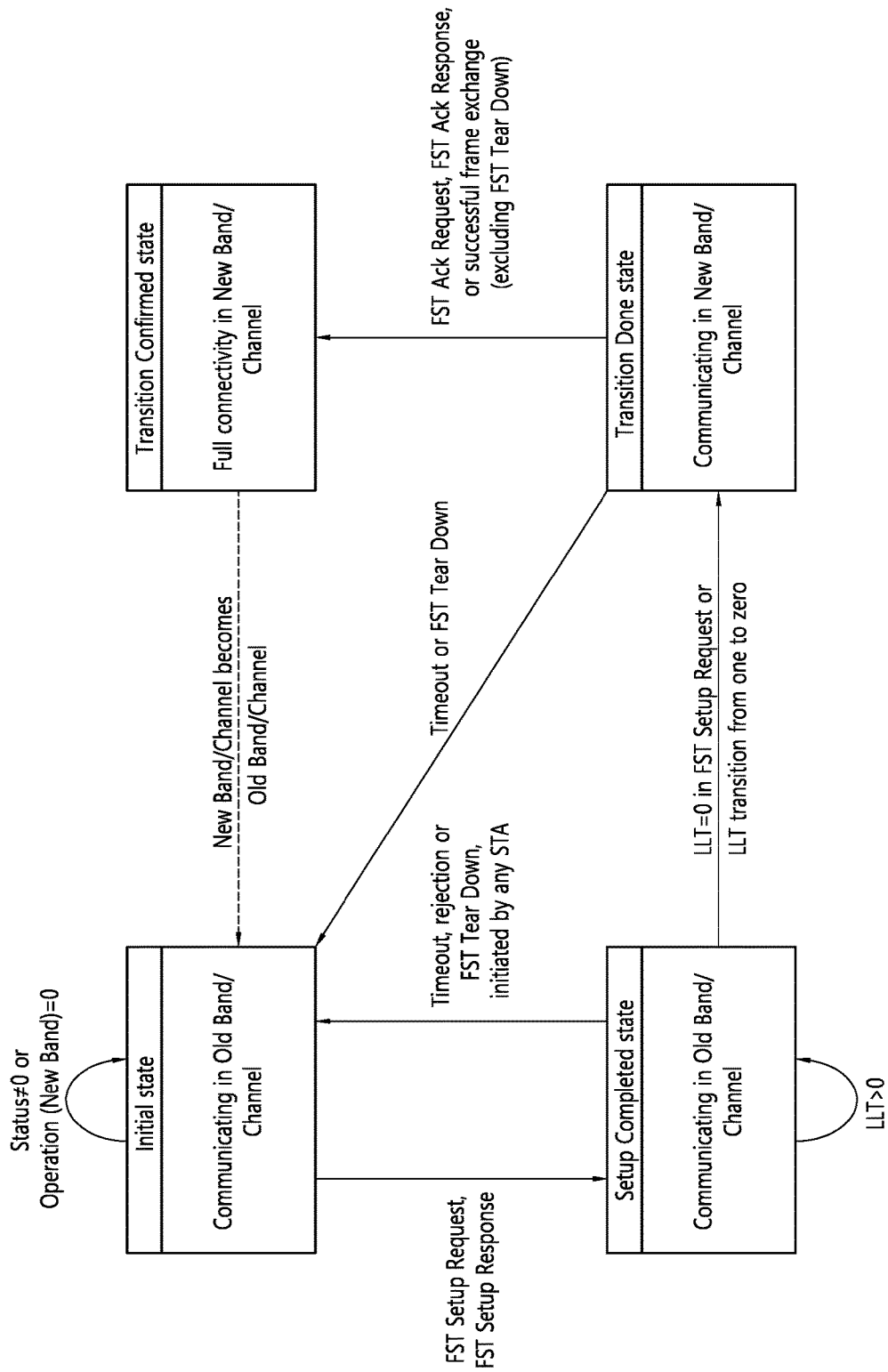
FIG. 14 illustrates four states of an FST setup protocol.
Figure 15:
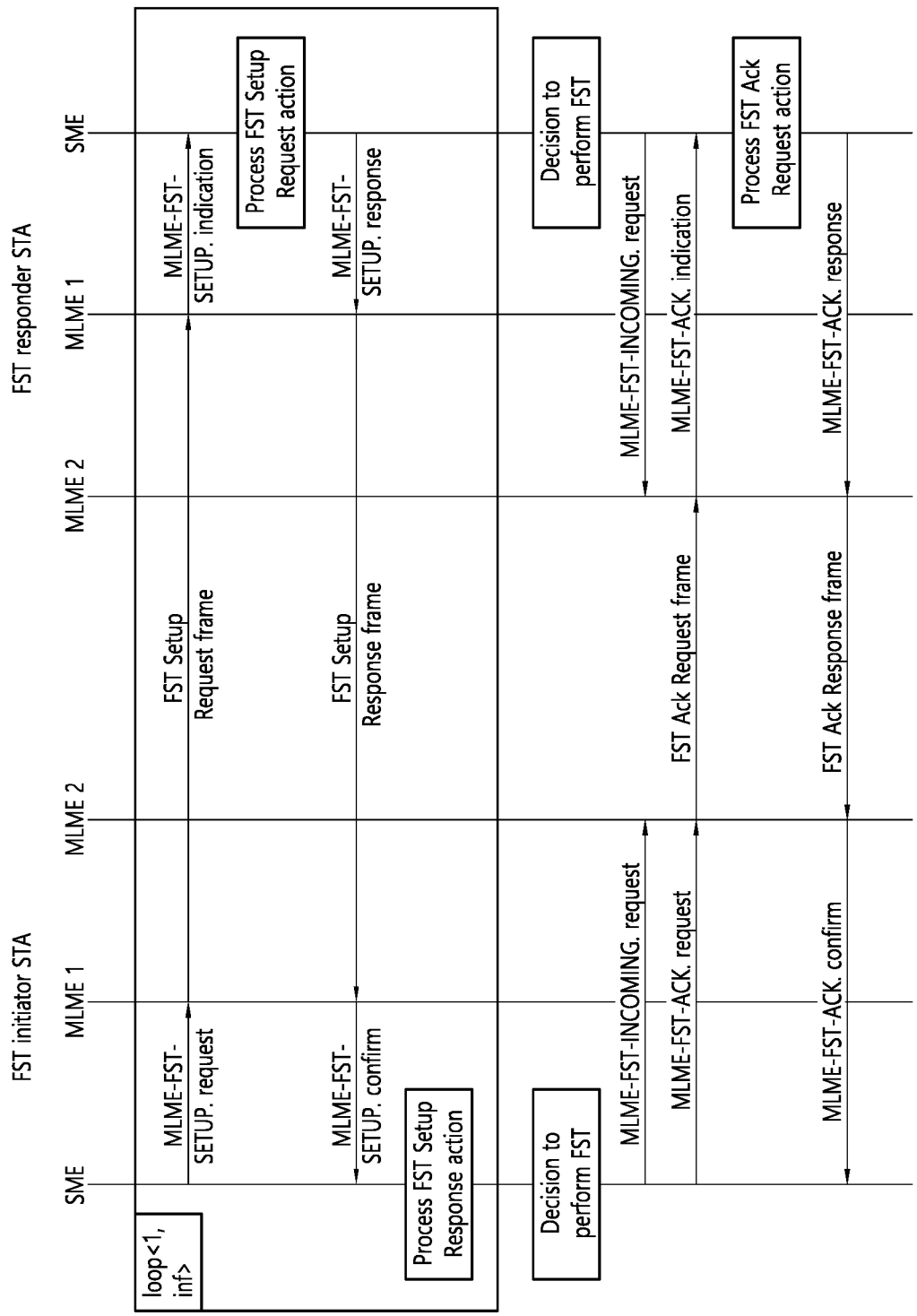
FIG. 15 illustrates a procedure of an FST setup protocol

FIG. 14 illustrates four states of the FST setup protocol.
FIG. 15 illustrates a procedure of the FST setup protocol.
FIG. 15 illustrates a procedure of the FST setup protocol for driving a state machine shown in FIG. 14. The procedure of FIG. 15 is an example of a basic procedure, and does not cover all possible usages of the protocol. In FIG. 15, a MAC layer management entity (MLME) 1 and an MLME 2 represent any two MLMEs of a device in which a multi-band is possible according to a reference model described in a reference model for a multi-band operation. As will be described later, FST Setup Request and FST Setup Response frames are exchanged optionally in a repeated manner until an FST initiator and an FST responder move successfully in a Setup Completed state. An operation of the procedure of the FST setup protocol is exemplified in FIG. 15.

In order to establish an FST session in an Initial state and to transfer it in the Setup Completed state of the FST setup protocol, the initiator and the responder shall exchange FST Setup Request and FST Setup Response frames. The FST session exists in the Setup Completed state, a Transition Done state, or a Transition Confirmed state. In the Initial state and the Setup Completed state, an old band/channel represents a frequency band/channel on which the FST session is transferred, and a new band/channel represents a frequency band/channel on which the FST session is transferred. In the Transition Done state, the new band/channel represents a frequency band/channel on which FST Ack Request and FST Ack Response frames are transmitted, and the old band/channel represents a frequency band/channel on which the FST session is transferred.

If the responder accepts the FST Setup Request, a Status Code field is set to SUCCESS, and a Status Code is set to REJECTED WITH SUGGESTED CHANGES. Thus, one or more parameters of the FST Setup Request frame are invalid, and a replacement parameter shall be proposed. In addition, the responder sets the Status Code field to PENDING_ADMITTING_FST_SESSION or PENDING_GAP_IN_BA_WINDOW to indicate that the FST Setup Request is pending, and sets the Status Code field to REQUEST_DECLINED to reject the FST Setup Request frame.

A responder which is an enabling STA sets a Status Code to REJECT_DSE_BAND and thus is initiated by a dependent STA which requests to switch to a frequency band subject to a DSE procedure. Therefore, it is indicated that the FST Setup Request frame is rejected. In this case, if a responder is an enabling STA for the dependent STA, the responder may indicate a duration in a TU before an FST setup starts with respect to the dependent STA by including a Timeout Interval element in the FST Setup Response frame. A Timeout Interval Type field in the Timeout Interval element shall be set to 4. The responder may use a parameter in the FST Setup Request frame received from the dependent STA to initiate the FST setup with respect to the initiator.

A responder which is a dependent STA and which is not enabled shall reject all FST Setup Request frames received for switching to a frequency band subject to the DSE procedure, except for a case where a transmitter of the FST setup Request frame is an enabling STA of the dependent STA.

4. Embodiments Applicable to the Present Disclosure

Figure 16:
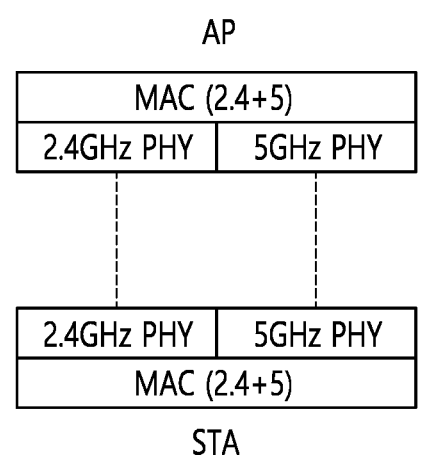
FIG. 16 illustrates an example of multi-band aggregation using a 2.4 GHz band and a 5 GHz band.

FIG. 16 illustrates an example of multi-band aggregation using a 2.4 GHz band and a 5 GHz band.

Referring to FIG. 16, an AP and a STA may transmit and receive data through aggregation of the 2.4 GHz band and the 5 GHz band. Multi-band aggregation may be performed using not only 2.4./5 GHz but also any bands ranging from 1 to 7.125 GHz, and aggregation may also be performed using a plurality of RFs within the same band (e.g., 5 GHz). Therefore, there is an opportunity to use not only a bandwidth used in legacy 802.11 but also a bandwidth of 160 MHz or more (e.g., 320 MHz) by employing multi-band aggregation or a plurality of RFs within the same band.

In order to conduct conventional contention in a structure illustrated in FIG. 16, backoff is performed for one designated 20 MHz primary channel (Primary 20 or P20) regardless of a multi-band, and a transmission bandwidth is determined by determining whether a secondary channel is idle/busy during a previous PIFS (or DIFS) at a moment when transmission is possible in P20 (backoff count=0).

However, as a considerably wide bandwidth of 160 MHz or more can be used, a secondary channel having a wide bandwidth, such as a 160 MHz secondary channel (Secondary 160) and a 320 MHz secondary channel (Secondary 320), may exist. Particularly, in a dense environment, the secondary channel is highly likely to be busy and thus is remarkably less likely to be available. Further, when CCA is performed on the secondary channel according to a legacy CCA rule (Primary 20->Secondary 20->Secondary 40 . . . ), the legacy rule cannot be used in a band aggregation combination (e.g., 120 (40+80) MHz, 240 (80+160) MHz, and the like) other than that in 20/40/80/160/320 MHz.

Therefore, to solve the foregoing problems, the present disclosure proposes a contention method in which a primary channel is assigned for each band (or RF).

Figure 17:
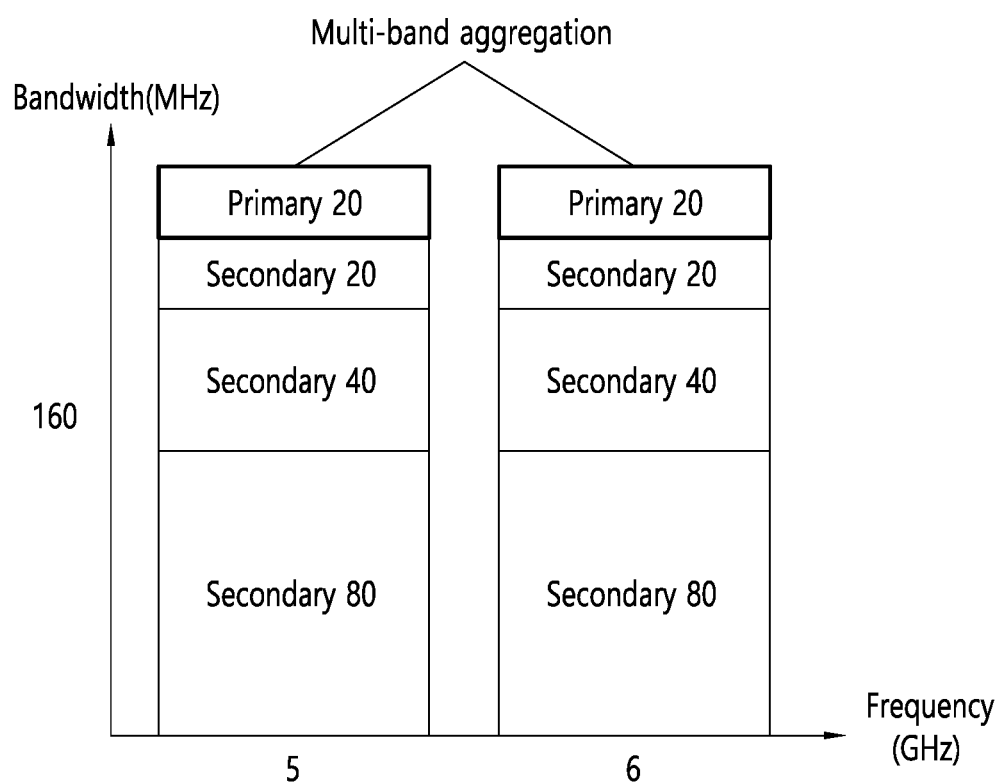
FIG. 17 illustrates an example in which a primary channel exists in each band (or RF) when performing multi-band aggregation.

FIG. 17 illustrates an example in which a primary channel exists in each band (or RF) when performing multi-band aggregation.

As illustrated in FIG. 17, when 160 MHz of a 5 GHz band and 160 MHz of a 6 GHz band are aggregated, P20 exists in each band, in which P20 may exist regardless of a bandwidth size (20 MHz or more) applied in each band (or RF).

Basically, a Wi-Fi system performs contention based on one P20, and an EDCA function (EDCAF) requires a contention window (CW) value and a backoff count (BC) randomly selected in a range from 0 to CW for contention for each access category (AC). Therefore, when there is a plurality of primary channels, that is, when a primary channel exists in each band (or RF), a new contention rule is required for frame transmission, and a CW and a BC may be applied as follows.

A. To apply common CW to all P20s and separate BC to each P20

->In method A, a legacy BC decrement rule for each primary channel can be flexibly applied, while more processing overhead is required. Further, a CW adjustment method depending on success in transmission in each band is additionally required.

B. To apply common CW and common BC to all P20s

->In method B, one CW and one BC can be maintained as conventionally regardless of the number of primary channels, while a new BC decrement rule is required according to the channel state of each P20.

C. To apply separate CW to each P20 and separate BC to each P20

->In method C, the legacy BC decrement rule for each primary channel and a legacy CW adjustment method depending on success in transmission can be flexibly applied, while more processing overhead is required.

When method B is applied, the BC decrement rule may be applied as follows.

1) To reduce BC value when channel states of all P20s are idle

->Since all P20s are viewed in an integrated manner, the probability of a collision may be reduced, but transmission latency may be increased.

2) To reduce BC value when channel state of at least one of all P20s is idle

->1) Although transmission latency may be reduced compared to method 1), the probability of a collision may increase because another busy P20 is ignored.

In IEEE 802.11ac, information on a channel currently used by an AP is notified to a terminal using a VHT Operation element.

Figure 18:
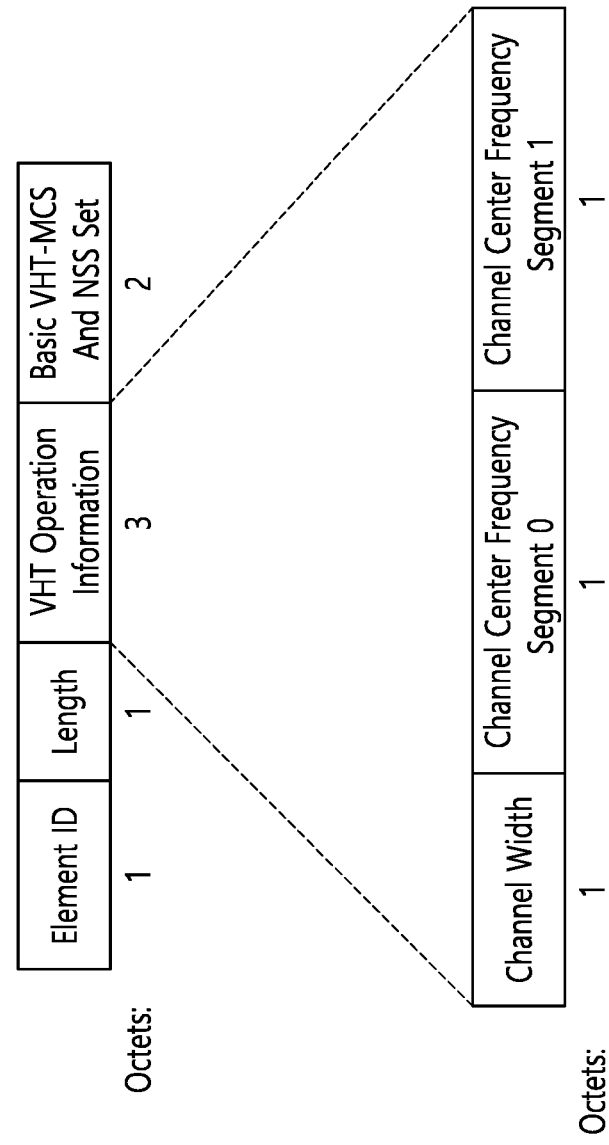
FIG. 18 illustrates an example of a VHT Operation element format.

FIG. 18 illustrates an example of a VHT Operation element format.

The operation of a VHT STA in a BSS is controlled by a HT Operation element and a VHT Operation element of FIG. 18.

The VHT STA obtains primary channel information from the HT Operation element. A VHT Operation Information subfield of FIG. 18 may be defined as follows.

TABLE 14

| Subfield | Definition | Encoding |
| --- | --- | --- |
| Channel Width | This field, together with the HT Operation element STA Channel Width field, defines the BSS bandwidth (sec 11.39.1 (Basic VHT BSS functionality)). | Set to 0 for 20 MHz or 40 MHz BSS bandwidth. Set to 1 for 80 MHz, 160 MHz or 80 + 80 MHz BSS bandwidth. Set to 2 for 160 MHz BSS bandwidth (deprecated). Set to 3 for non-contiguous 80 + 80 MHz BSS bandwidth (deprecated). Values in the range 4 to 255 are reserved. |
| Channel Center Frequency Segment 0 | Defines a channel center frequency for (M30)a 20, 40, 80, 160, or 80 + 80 MHz VHT BSS. See 21.3.14 (Channelization). | For (M30) 20, 40, or 80 MHz BSS bandwidth, indicates the channel center frequency index for the (M30) 20, 40, or 80 MHz channel on which the VHT BSS operates. For 160 MHz BSS bandwidth and the Channel Width subfield equal to 1, indicates the channel center frequency index of the 80 MHz channel segment that contains the primary channel. For 160 MHz BSS bandwidth and the Channel Width subfield equal to 2, indicates the channel center frequency index of the 160 MHz channel on which the VHT BSS operates. For 80 + 80 MHz BSS bandwidth and the Channel Width subfield equal to 1 or 3, indicates the channel center frequency index for the primary 80 MHz channel of the VHT BSS. Reserved otherwise. |
| Channel Center Frequency Segment 1 | Defines a channel center frequency for a 160 or 80 + 80 MHz VHT BSS. See 21.3.14 (Channelization). | For a 20, 40, or 80 MHz BSS bandwidth, this subfield is set to 0. For a 160 MHz BSS bandwidth and the Channel Width subfield equal to 1, indicates the channel center frequency index of the 160 MHz channel on which the VHT BSS operates. For a 160 MHz BSS bandwidth and the Channel Width subfield equal to 2, this field is set to 0. For an 80 + 80 MHz BSS bandwidth and the Channel Width subfield equal to 1 or 3, indicates the channel center frequency index of the secondary 80 MHz channel of the VHT BSS. See Table 9-276 (BSS bandwidth when the VHT Operation Information field Channel Width subfield is 1). Reserved otherwise. |

When a Channel Width subfield of the VHT Operation Information subfield is set to 1, a BSS bandwidth may be 80 MHz, 160 MHz, or 80+80 MHz. Here, the BSS bandwidth according to the value of a Channel Center Frequency Segment (CCFS) 1 subfield may be defined as follows.

TABLE 15

| Channel Center Frequency Segment 1 subfield value | BSS bandwidth |
|---|---|
| CCFS1 = 0 | 80 MHz or less |
| CCFS1 > 0 and \| CCFS1 − CCFS0 \| = 8 (40 MHz apart) | 160 MHz (CCFS0: center frequency of the 80 MHz channel segment that contains the primary channel) (CCFS1: center frequency of the 160 MHz channel) |
| CCFS1 > 0 and \| CCFS1 − CCFS0 \| > 16 (>80 MHz apart) | 80 + 80 MHz (CCFS0: center frequency of the primary 80 MHz channel) (CCFS1: center frequency of the secondary 80 MHz channel) |
| CCFS1 > 0 and \| CCFS1 − CCFS0 \| < 8 (<40 MHz apart) | Reserved |
| CCFS1 > 0 and 8 < \| CCFS1 − CCFS0 \| ≤ 16 (>40 MHz and ≤80 MHz apart) | Reserved |

NOTE 1-
CCFS0 represents the value of the Channel Center Frequency Segment 0 subfield.
NOTE 2-
CCFS1 represents the value of the Channel Center Frequency Segment 1 subfield.

A channel center frequency (CCF, in MHz) may be obtained by channel starting frequency +5*dot 11 CurrentChannelCenterFrequencyIndex.

Figure 19:
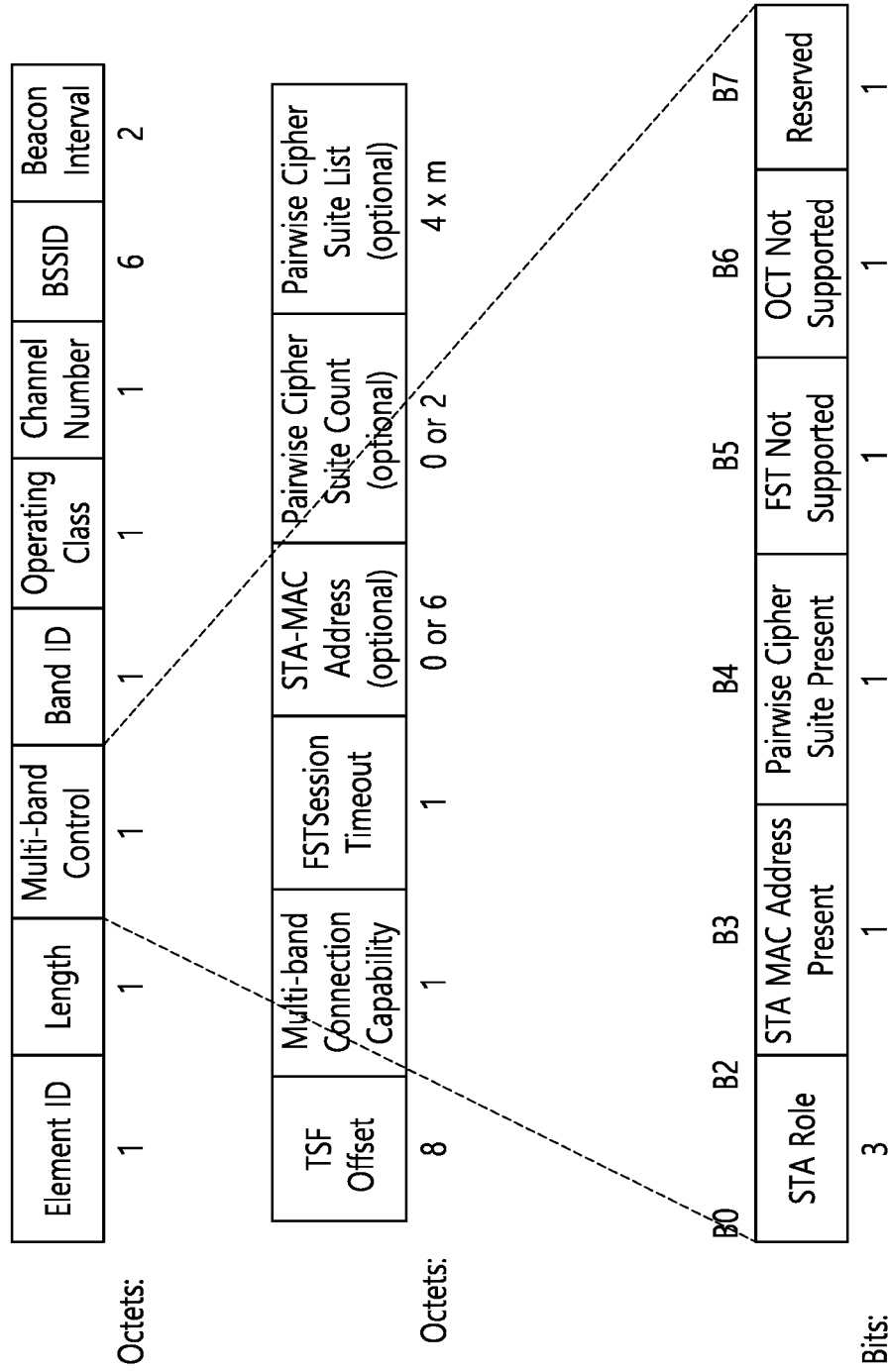
FIG. 19 illustrates an example of a Multi-band element format.

FIG. 19 illustrates an example of a Multi-band element format.

A Multi-band element of FIG. 19 indicates that a STA transmitting the element is included in a multi-band device capable of operating in a frequency band, an operating class, or a channel other than a channel through which the element is transmitted. Further, when part of fast session transfer (FST) is used, the element indicates that the transmitting STA is capable of performing a FST from a current channel to a channel used by a different STA in the same device in the same band or a different band.

The Multi-band element of FIG. 19 includes a Multi-band Control field, and the Multi-band Control field includes STA Role, STA MAC Address Present, Pairwise Cipher Suite Present, FST Not Supported, and OCT Not Supported fields, and the like.

5. Proposed Embodiments

The present disclosure proposes the structure of a Band Switch Announcement element or frame that can be used when an AP using an RF supporting two or more different bands (e.g., 5 GHz and 6 GHz) desires to change a transmission band, and a method for using the same.

Although there are existing APs supporting two or more bands at the same time, the APs are actually the same only in physical location but are used in separately established BSSs. Therefore, each AP communicates with each STA in each BSS.

Currently, 802.11ax has extended a supported transmission band to 6 GHz, and EHT or 802.11be, which is currently under standardization, is also scheduled to support a 6 GHz band. A device supporting 5 GHz and 6 GHz can operate an antenna/RF chain exclusively to each band as done so far but may include a switchable antenna/RF chain capable of supporting both 5 GHz and 6 GHz due to the constraints of space on the device due to a spatial constraint of the device.

5.1. Element for Changing Channel Operated by AP (Defined in Existing 802.11 Baseline Specification)

As a large number of channels are supported in one band, the 802.11 baseline specification supports an element for changing a channel operated by an AP. FIG. 20 and FIG. 21 illustrate a Channel Switch Announcement element and an Extended Channel Switch Announcement element defined in the 802.11 baseline specification.

FIG. 20 illustrates an example of a Channel Switch Announcement element format.

The Channel Switch Announcement element of FIG. 20 is used for advertising by an AP, an IBSS STA, a mesh STA, or a PCP when a new channel and the channel number of the new channel are changed.

For a non-mesh STA, a Channel Switch Count field is set to the number of TBTTs until the STA transmitting the Channel Switch Announcement element switches to a new channel or is set to 0. A value of 1 indicates that a switch occurs just before the next TBTT. A value of 0 indicates that a switch occurs at any time after a frame including the element is transmitted.

For a mesh STA, the Channel Switch Count field is encoded in octets from bits 6 to 0 set in time, and is encoded in 2 TUs when the MSB (bit 7) is 0 or is encoded in 100 TUs when the MSB (bit 7) is 1. The MSB is 1 until the mesh STA transmitting the Channel Switch Announcement element switches to a new channel. A value of 0 for bits 6 to 0 indicates that a switch occurs at any time after a frame including the element is transmitted. For example, a 200 TU channel switch time is encoded as X'82', and a 10 TU channel switch time is encoded as X'05'.

The Channel Switch Announcement element is included in a Channel Switch Announcement frame, and may be included in a beacon frame. Uses of the Channel Switch Announcement element and frame are described in new channel selection and advertising.

FIG. 21 illustrates an example of an Extended Channel Switch Announcement element format.

The Extended Channel Switch Announcement element of FIG. 21 is used for advertising by an AP, an IBSS STA, a mesh STA, or a PCP when a BSS is changed to a new channel and the channel number of the new channel. The element includes both the operating class and the channel number of the new channel. The element exists only when extended channel switching is pending.

The elements (FIG. 20 and FIG. 21) can be used to change a channel or to change a channel and an operating class but do not support a field for defining an antenna, an RF chain, a spatial stream, or the like. Thus, it is required to define an element in a new format in order to change only part of an antenna/RF chain.

The present disclosure proposes a method for indicating that an AP changes at least one antenna/RF chain to a different band when the AP using a switchable antenna/RF chain capable of supporting a plurality of bands changes the at least one antenna/RF chain to the different band and an element structure therefor.

5.2. Element Structure Defined for AP to Change at Least One Antenna/RF Chain to Different Band and Embodiment Thereof 1) Operation Process FIG. 22 illustrates an example of a Band Switch Announcement element format.

Figure 22:
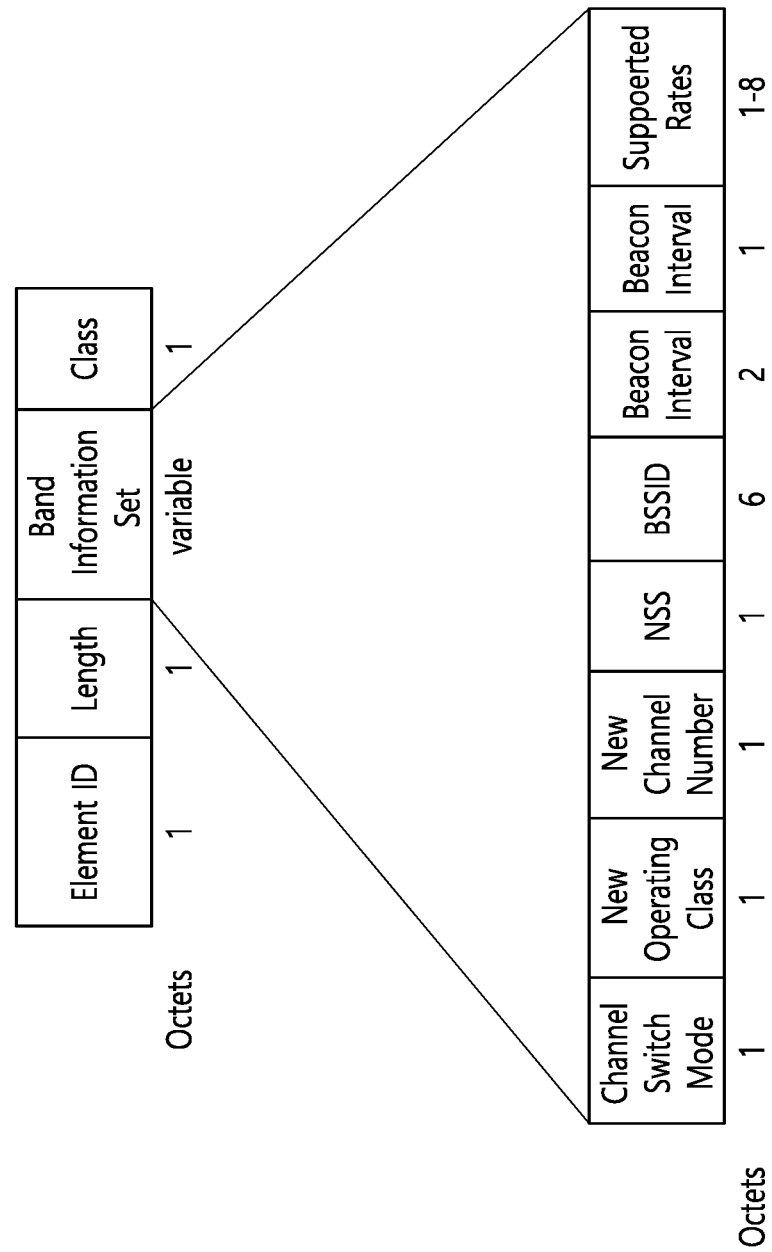
FIG. 22 illustrates an example of a Band Switch Announcement element format.

A Band Switch Announcement element of FIG. 22 may include the following pieces of information.

Band Information (Set): Includes information on a band after switching

Channel Switch Mode: Field included in an existing (Extended) Channel Switch Announcement element, which can prohibit a STA receiving this information from performing transmission until band switching occurs.

New Operating Class: Includes operating class information on a band after switching. Country element and operating class values specified in the 802.11 baseline specification can be used.

New Channel Number: Includes information on an operating channel after band switching. Country element and operating class values specified in the 802.11 baseline specification can be used.

NSS: Indicates the number of spatial streams to be operated in a band and a channel corresponding to the new operating class and the new channel number defined above.

BSSID: Indicates the BSSID of a new BSS to be established when the BSS is established. This information can be omitted if the same BSSID is used.

Beacon Interval: Indicates a beacon interval in a defined channel. This information can be omitted if the same beacon interval is used.

EDCA Interval: Indicates time information on an interval if there is an EDCA/scheduled-only access interval in a defined channel.

Supported Rates: Indicates a data rate that can be supported in a defined channel.

Count: Indicates the number of beacons remaining until defined switching is applied.

Information other than the foregoing pieces of information may also be included in the element of FIG. 22.

The element of FIG. 22 is an example of a Band Switch Announcement element, and the length of each field may vary. Further, additional information may be included or unnecessary information may be omitted.

Figure 23:
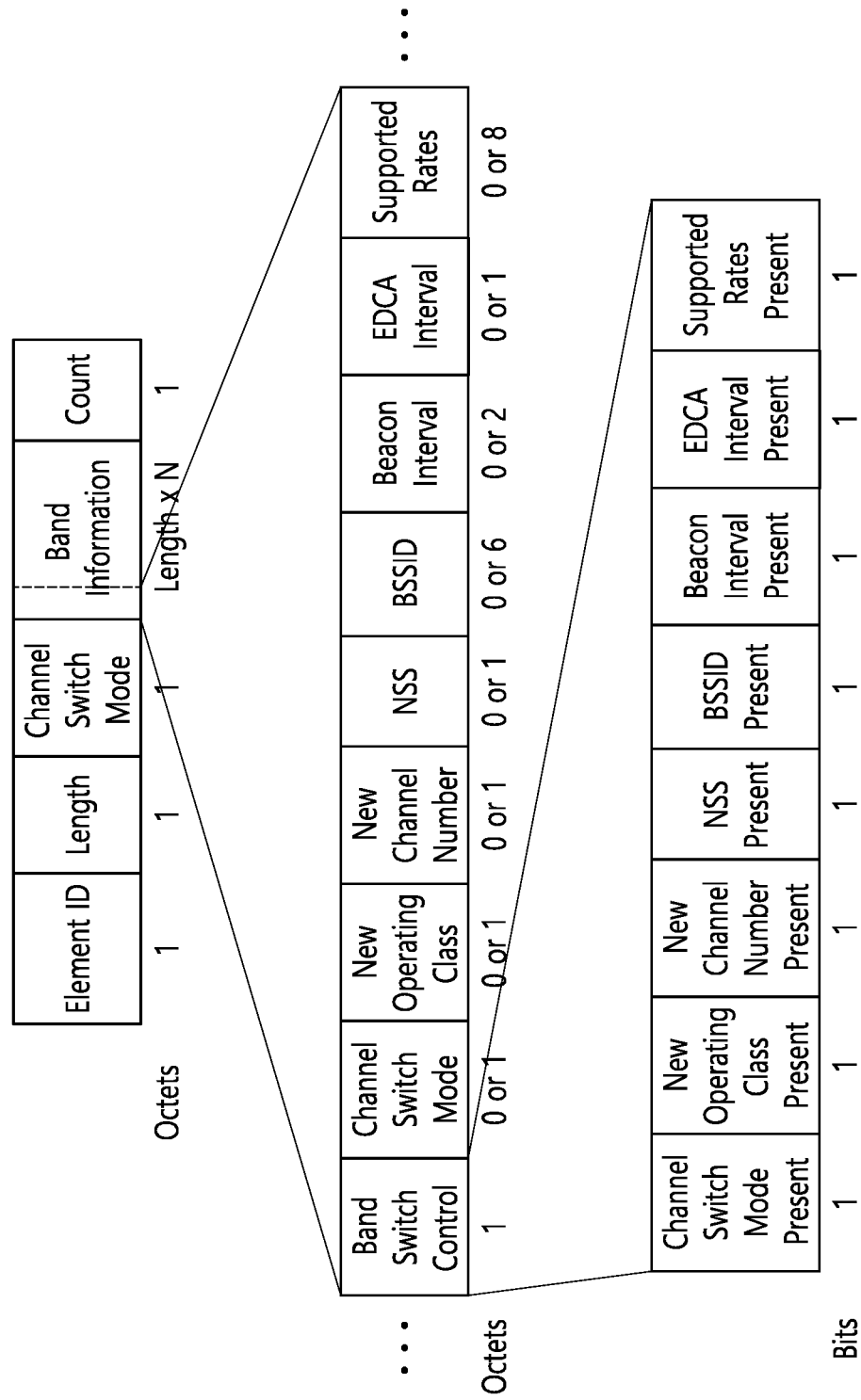
FIG. 23 illustrates another example of a Band Switch Announcement element format.

FIG. 23 illustrates another example of a Band Switch Announcement element format.

As illustrated in FIG. 23, it is possible to indicate all information on a band changed after band switching within one element. At least one piece of band information may be included in one field referred to as Band Switch List. A subfield in the List may be indicated through a Band Switch Control field of FIG. 23.

2) Examples 2-1) 5 GHz RF×4->5 GHz RF×2+6 GHz RF×2

Figure 24:
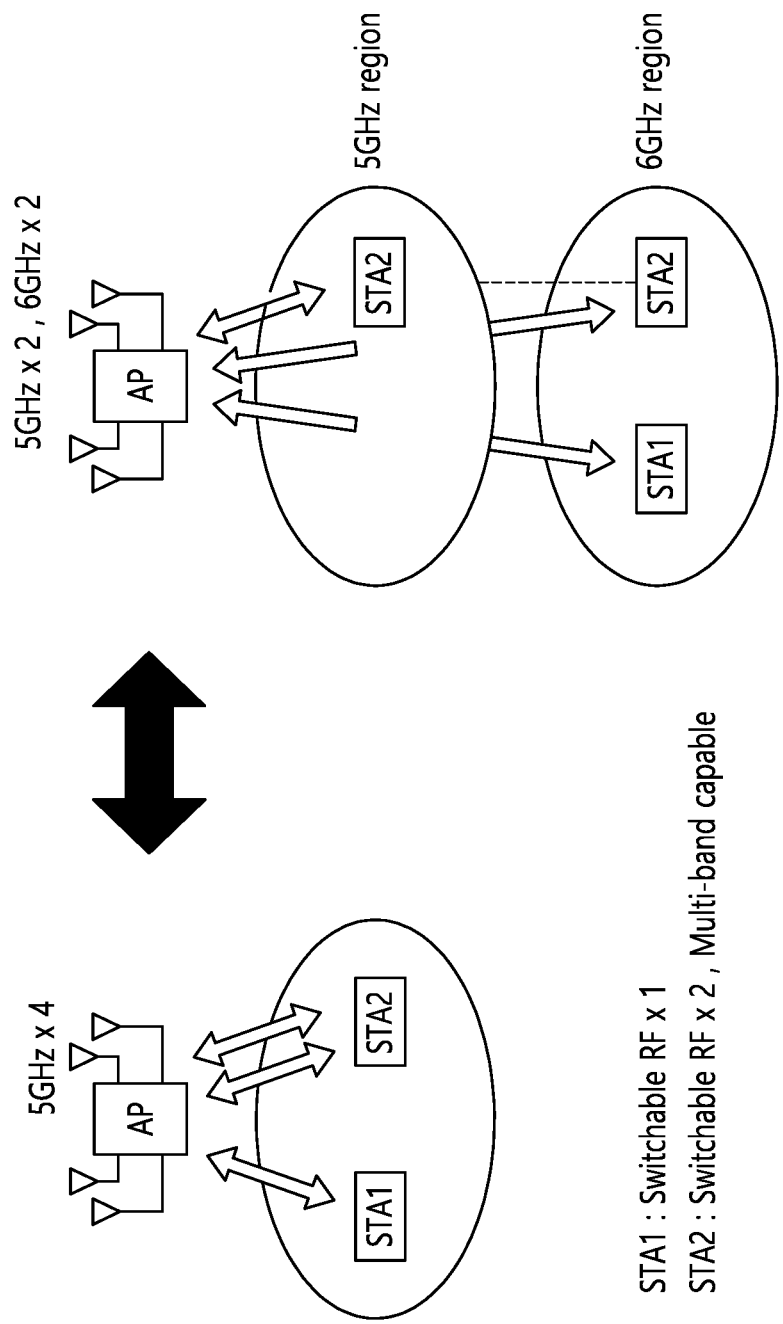
FIG. 24 illustrates an example of a band switching procedure.

FIG. 24 illustrates an example of a band switching procedure.

A congestion level in 5 GHz and 6 GHz bands may significantly vary depending on the capability of a device (or STA) associated with an AP. Therefore, the AP having switchable RFs and operating in the 5 GHz band may desire to change some of the RFs to 6 GHz.

As illustrated in FIG. 24, when the AP having the switchable RFs desires to change some of the RFs to a different band, the AP may transmit a Band Switch Announcement element to the associated STA. STA 1 using a switchable RF switches to 6 GHz and then performs a transmission/reception process.

When STA 2 also has a switchable RF and can use two or more different bands at the same time (is multi-band capable), STA 2 receiving the Band Switch Announcement element may determine whether to switch a band based on information included in the Band Switch Announcement element. After determining to switch only one RF and to perform transmission and reception via a multi-band, STA2 changes one RF from the 5 GHz band to the 6 GHz band and then performs transmission and reception.

As illustrated in the embodiment of FIG. 24, a STA that desires to perform band switching needs to notify the AP that the STA desires to perform the band switching in order to enable the AP to attempt DL transmission. This operation may be possible by transmitting a random frame or a QoS null frame in a band to which STA2 desires to change (6 GHz in this embodiment). However, in this disclosure, an operation method of the STA that enables the AP to transmit DL through band switching is not limited.

Hereinafter, the foregoing embodiment will be described with reference to FIG. 14 to FIG. 24.

Figure 25:
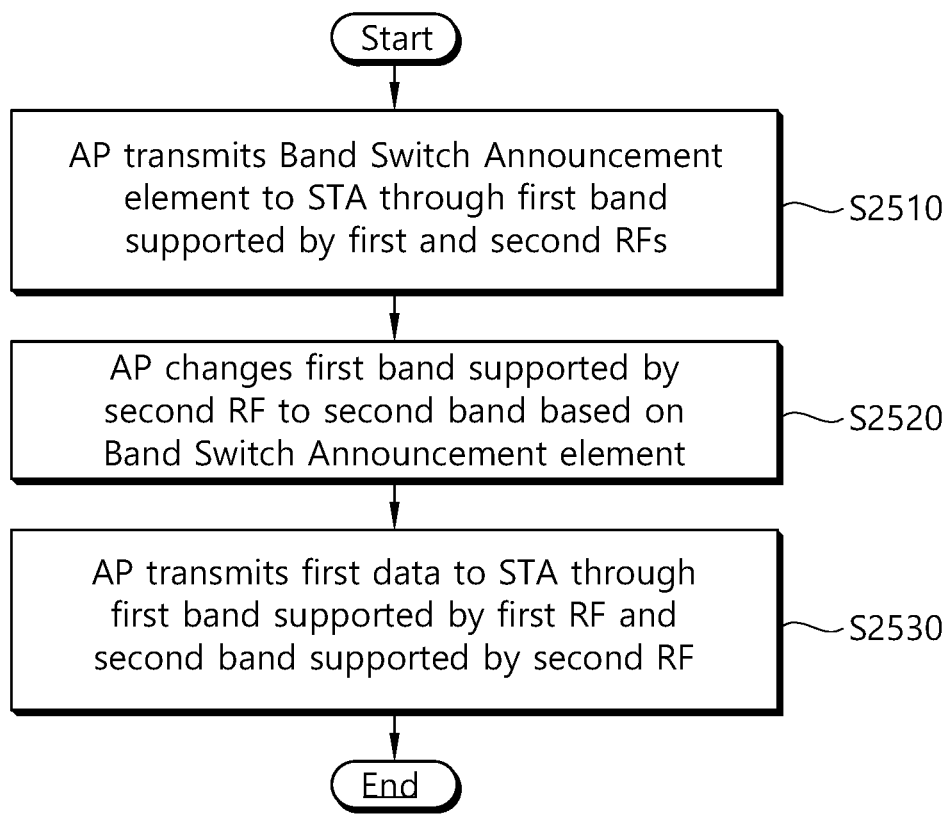
FIG. 25 is a flowchart illustrating a procedure in which an AP transmits data according to an embodiment.

FIG. 25 is a flowchart illustrating a procedure in which an AP transmits data according to an embodiment.

The embodiment of FIG. 25 may be performed in a network environment supporting a next-generation WLAN system. The next-generation WLAN system may be a WLAN system evolving from an 802.11ax system and may satisfy backward compatibility with the 802.11ax system. The next-generation WLAN system may correspond to an extremely high throughput (EHT) WLAN system or an 802.11be WLAN system.

The embodiment proposes a method for transmitting data through a multi-band by changing at least one antenna or RF chain to a different band in a next-generation WLAN, such as an EHT WLAN system.

The embodiment may be performed by an access point (AP), and a station (STA) of the embodiment may correspond to a STA supporting an EHT WLAN system. The AP and the STA may support a multi-band (or multi-link).

In operation S2510, the AP transmits a Band Switch Announcement element to the STA through a first band supported by first and second radio frequencies (RFs).

In operation S2520, the AP change the first band supported by the second RF to a second band based on the Band Switch Announcement element. The Band Witch Announcement element is used for the AP to notify the STA that a band supported by at least one RF is to be changed. Therefore, the AP may change a band supported by an RF after transmitting the Band Switch Announcement element without negotiating with the STA or receiving an ACK from the ACK.

In this embodiment, the AP assumes that the AP has the first and second RFs. Since the first and second RFs support the first band until the Band Switch Announcement element is transmitted, the AP can transmit data only through the first band. However, after the Band Switch Announcement element is transmitted, the first RF still supports the first band, while the second RF supports the second band to which the first band is changed.

In the next-generation WLAN system, the first and second RFs can change a band and thus may be referred to as switchable RFs. Although the embodiment is limited to a case where only a band supported by the second RF is changed, a band supported by the first RF may be changed by the Band Switch Announcement element.

In operation 52530, the AP transmits first data to the STA through the first band supported by the first RF and the second band supported by the second RF. Here, the first data is transmitted through a multi-band into which the first band and the second band aggregated. That is, the AP may change a band for the second RF and may then transmit the data through the multi-band.

The first band includes a first primary channel, and the second band includes a second primary channel.

When the multi-band includes only the two bands which are aggregated, the first band may be a 2.4 GHz or 5 GHz band, and the second band may be a 6 GHz band. When the multi-band further include a third band, the first band may be a 2.4 GHz band, the second band may be a 5 GHz band, and the third band may be a 6 GHz band. The foregoing configurations of the bands are provided only for illustration, and the WLAN system may support various numbers of bands and channels.

The Band Switch Announcement element may include band information on the second band.

The band information may include an Operating Class field, a Channel Number field, and a Number of Spatial Streams (NSS) field.

The Operating Class field may include operating class information on the second band. The Channel Number field may include operating channel information on the second band. The NSS field may include information on the second band and information on the number of spatial streams to be used for a channel in the second band.

The AP may indicate the number of RFs to be used in a new band based on the NSS field. That is, the AP may indicate some switchable RFs of which a supported band is changed based on the NSS field.

The band information may include a Basic Service Set Identifier (BSSID) field, a Beacon Interval field, an Enhanced Distributed Coordination Access (EDCA) Interval field, a Supported Rates field, and a Count field.

The BSSID field may include information on an identifier of a BSS configured for the second band. The Beacon Interval field may include information on a beacon interval configured for the channel in the second band.

The EDCA Interval field may include time information on an EDCA or scheduling access interval in the channel in the second band. The Supported Rates field may include information on a data rate supportable in the channel in the second band. The Count field may include information on the number of remaining transmissions of a beacon until the band supported by the second RF is changed.

An operation before transmitting the Band Switch Announcement element is as follows.

The AP may transmit second data to the STA through the first band. The second data may be transmitted by the first and second RFs before the Band Switch Announcement element is transmitted. That is, the first and second RFs transmit the data through the first band before the Band Switch Announcement element is transmitted. However, after the Band Switch Announcement element is transmitted, the band supported by the second RF is changed to the second band, and thus data may be transmitted though the multi-band.

Hereinafter, a signaling method for multi-band aggregation is described. In this embodiment, configuration information on a multi-band is described as being received, and signaling may be performed by employing an FST setup method.

A transmission device and a reception device to be illustrated below may correspond to the AP or the STA illustrated above. The transmission device may transmit a multi-band setup request frame to the reception device. The transmission device may receive a multi-band setup response frame from the reception device.

The transmission device may transmit a multi-band ACK request frame to the reception device. The transmission device may receive a multi-band ACK response frame from the reception device.

The transmission device may include a first station management entity (SME), a first MAC layer management entity (MLME), and a second MLME. The reception device may include a second SME, a third MLME, and a fourth MLME.

The first MLME and the third MLME may be entities supporting the first band, and the second MLME and the fourth MLME may be entities supporting the second band.

The multi-band setup request frame and the multi-band setup response frame may be transmitted and received between the first MLME and the third MLME. The multi-band ACK request frame and the multi-band ACK response frame may be transmitted and received between the second MLME and the fourth MLME.

The first and the second SMEs may generate a primitive including a multi-band parameter. The multi-band parameter may include a channel number designated in the multi-band, an operating class, and a band identifier (ID). The primitive may be transmitted to the first to fourth MLMEs.

When the FST setup method is employed for the multi-band aggregation, the FST setup method includes four states and a rule for a method of transitioning one state to a next state. The four states are Initial, Setup Completed, Transition Done, and Transition Confirmed states.

In the Initial state, the transmission device and the reception device communicate in an old band/channel. Here, when an FST setup request frame an FST setup response frame are transmitted and received between the transmission device and the reception device, the transmission device and the reception device transition to the Setup Completed state and are ready to change the currently operating band/channel(s). An FST session may be entirely or partially transferred to another band/channel.

When an LLT value included in the FST setup request frame is 0, the transmission device and the reception device transition from the Setup Completed state to the Transition Done state and are allowed to operate in different bands/channels.

Both the transmission device and the reception device need to succeed in communication in a new band/channel to reach the Transition Confirmed state. Here, when an FST ACK request frame and an FST ACK response frame are transmitted and received between the transmission device and the reception device, the transmission device and the reception device transition to the Transition Confirmed state and establish a complete connection in the new band/channel.

FIG. 26 is a flowchart illustrating a procedure in which a STA receives data according to an embodiment.

The embodiment of FIG. 26 may be performed in a network environment supporting a next-generation WLAN system. The next-generation WLAN system may be a WLAN system evolving from an 802.11ax system and may satisfy backward compatibility with the 802.11ax system. The next-generation WLAN system may correspond to an extremely high throughput (EHT) WLAN system or an 802.11be WLAN system.

The embodiment proposes a method for transmitting data through a multi-band by changing at least one antenna or RF chain to a different band in a next-generation WLAN, such as an EHT WLAN system.

The embodiment may be performed by a STA, and the STA may correspond to a STA supporting an EHT WLAN system. The AP and the STA of the embodiment may support a multi-band (or multi-link).

In operation S2610, the STA receives a Band Switch Announcement element from the AP through a first band supported by first and second RFs. The first band supported by the second RF is changed to a second band based on the Band Switch Announcement element. The Band Witch Announcement element is used for the AP to notify the STA that a band supported by at least one RF is to be changed. Therefore, the AP may change a band supported by an RF after transmitting the Band Switch Announcement element without negotiating with the STA or receiving an ACK from the ACK.

In this embodiment, the AP assumes that the AP has the first and second RFs. Since the first and second RFs support the first band until the Band Switch Announcement element is transmitted, the AP can transmit data only through the first band. However, after the Band Switch Announcement element is transmitted, the first RF still supports the first band, while the second RF supports the second band to which the first band is changed.

In the next-generation WLAN system, the first and second RFs can change a band and thus may be referred to as switchable RFs. Although the embodiment is limited to a case where only a band supported by the second RF is changed, a band supported by the first RF may be changed by the Band Switch Announcement element.

In operation S2620, the STA receives first data from the AP through the first band supported by the first RF and the second band supported by the second RF. Here, the first data is transmitted through a multi-band into which the first band and the second band aggregated. That is, the AP may change a band for the second RF and may then transmit the data through the multi-band.

The first band includes a first primary channel, and the second band includes a second primary channel.

When the multi-band includes only the two bands which are aggregated, the first band may be a 2.4 GHz or 5 GHz band, and the second band may be a 6 GHz band. When the multi-band further include a third band, the first band may be a 2.4 GHz band, the second band may be a 5 GHz band, and the third band may be a 6 GHz band. The foregoing configurations of the bands are provided only for illustration, and the WLAN system may support various numbers of bands and channels.

The Band Switch Announcement element may include band information on the second band.

The band information may include an Operating Class field, a Channel Number field, and a Number of Spatial Streams (NSS) field.

The Operating Class field may include operating class information on the second band. The Channel Number field may include operating channel information on the second band. The NSS field may include information on the second band and information on the number of spatial streams to be used for a channel in the second band.

The AP may indicate the number of RFs to be used in a new band based on the NSS field. That is, the AP may indicate some switchable RFs of which a supported band is changed based on the NSS field.

The band information may include a Basic Service Set Identifier (BSSID) field, a Beacon Interval field, an Enhanced Distributed Coordination Access (EDCA) Interval field, a Supported Rates field, and a Count field.

The BSSID field may include information on an identifier of a BSS configured for the second band. The Beacon Interval field may include information on a beacon interval configured for the channel in the second band.

The EDCA Interval field may include time information on an EDCA or scheduling access interval in the channel in the second band. The Supported Rates field may include information on a data rate supportable in the channel in the second band. The Count field may include information on the number of remaining transmissions of a beacon until the band supported by the second RF is changed.

An operation before transmitting the Band Switch Announcement element is as follows.

The AP may transmit second data to the STA through the first band. The second data may be transmitted by the first and second RFs before the Band Switch Announcement element is transmitted. That is, the first and second RFs transmit the data through the first band before the Band Switch Announcement element is transmitted. However, after the Band Switch Announcement element is transmitted, the band supported by the second RF is changed to the second band, and thus data may be transmitted though the multi-band.

Hereinafter, a signaling method for multi-band aggregation is described. In this embodiment, configuration information on a multi-band is described as being received, and signaling may be performed by employing an FST setup method.

A transmission device and a reception device to be illustrated below may correspond to the AP or the STA illustrated above. The transmission device may transmit a multi-band setup request frame to the reception device. The transmission device may receive a multi-band setup response frame from the reception device.

The transmission device may transmit a multi-band ACK request frame to the reception device. The transmission device may receive a multi-band ACK response frame from the reception device.

The transmission device may include a first station management entity (SME), a first MAC layer management entity (MLME), and a second MLME. The reception device may include a second SME, a third MLME, and a fourth MLME.

The first MLME and the third MLME may be entities supporting the first band, and the second MLME and the fourth MLME may be entities supporting the second band.

The multi-band setup request frame and the multi-band setup response frame may be transmitted and received between the first MLME and the third MLME. The multi-band ACK request frame and the multi-band ACK response frame may be transmitted and received between the second MLME and the fourth MLME.

The first and the second SMEs may generate a primitive including a multi-band parameter. The multi-band parameter may include a channel number designated in the multi-band, an operating class, and a band identifier (ID). The primitive may be transmitted to the first to fourth MLMEs.

When the FST setup method is employed for the multi-band aggregation, the FST setup method includes four states and a rule for a method of transitioning one state to a next state. The four states are Initial, Setup Completed, Transition Done, and Transition Confirmed states.

In the Initial state, the transmission device and the reception device communicate in an old band/channel. Here, when an FST setup request frame an FST setup response frame are transmitted and received between the transmission device and the reception device, the transmission device and the reception device transition to the Setup Completed state and are ready to change the currently operating band/channel(s). An FST session may be entirely or partially transferred to another band/channel.

When an LLT value included in the FST setup request frame is 0, the transmission device and the reception device transition from the Setup Completed state to the Transition Done state and are allowed to operate in different bands/channels.

Both the transmission device and the reception device need to succeed in communication in a new band/channel to reach the Transition Confirmed state. Here, when an FST ACK request frame and an FST ACK response frame are transmitted and received between the transmission device and the reception device, the transmission device and the reception device transition to the Transition Confirmed state and establish a complete connection in the new band/channel.

6. Device Configuration

Figure 27:
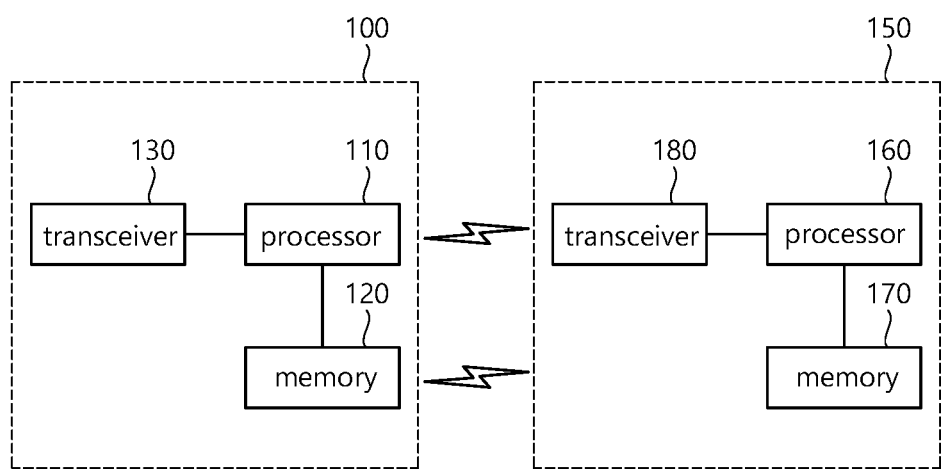
FIG. 27 is a diagram illustrating a device for implementing the aforementioned method.

FIG. 27 is a diagram illustrating a device for implementing the aforementioned method.

A wireless device (100) of FIG. 27 may be a transmission device capable of implementing the foregoing embodiments and may operate as an AP STA. A wireless device (150) of FIG. 27 may be a reception device capable of implementing the foregoing embodiments and may operate as a non-AP STA.

The transmission device (100) may include a processor (110), a memory (120), and a transceiver (130), and the reception device (150) may include a processor (160), a memory (170), and a transceiver (180). The transceiver (130, 180) transmits/receives a radio signal and may be operated in a physical layer of IEEE 802.11/3GPP, and so on. The processor (110, 160) may be operated in the physical layer and/or MAC layer and may be operatively connected to the transceiver (130, 180).

The processor (110, 160) and/or the transceiver (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor (110, 160) may implement the functions, processes and/or methods proposed in the present disclosure. For example, the processor (110, 160) may perform the operation according to the present embodiment.

A specific operation of the processor 110 of the transmission device is as follows. The processor 110 of the transmission device transmits a Band Switch Announcement element to the STA through a first band supported by first and second RFs, change the first band supported by the second RF to a second band based on the Band Switch Announcement element, and transmits first data to the STA through the first band supported by the first RF and the second band supported by the second RF.

A specific operation of the processor 160 of the reception device is as follows. The processor 160 of the reception device receives a Band Switch Announcement element from the AP through a first band supported by first and second RFs, and the first band supported by the second RF is changed to a second band based on the Band Switch Announcement element. The processor 160 receives first data from the AP through the first band supported by the first RF and the second band supported by the second RF.

Figure 28:
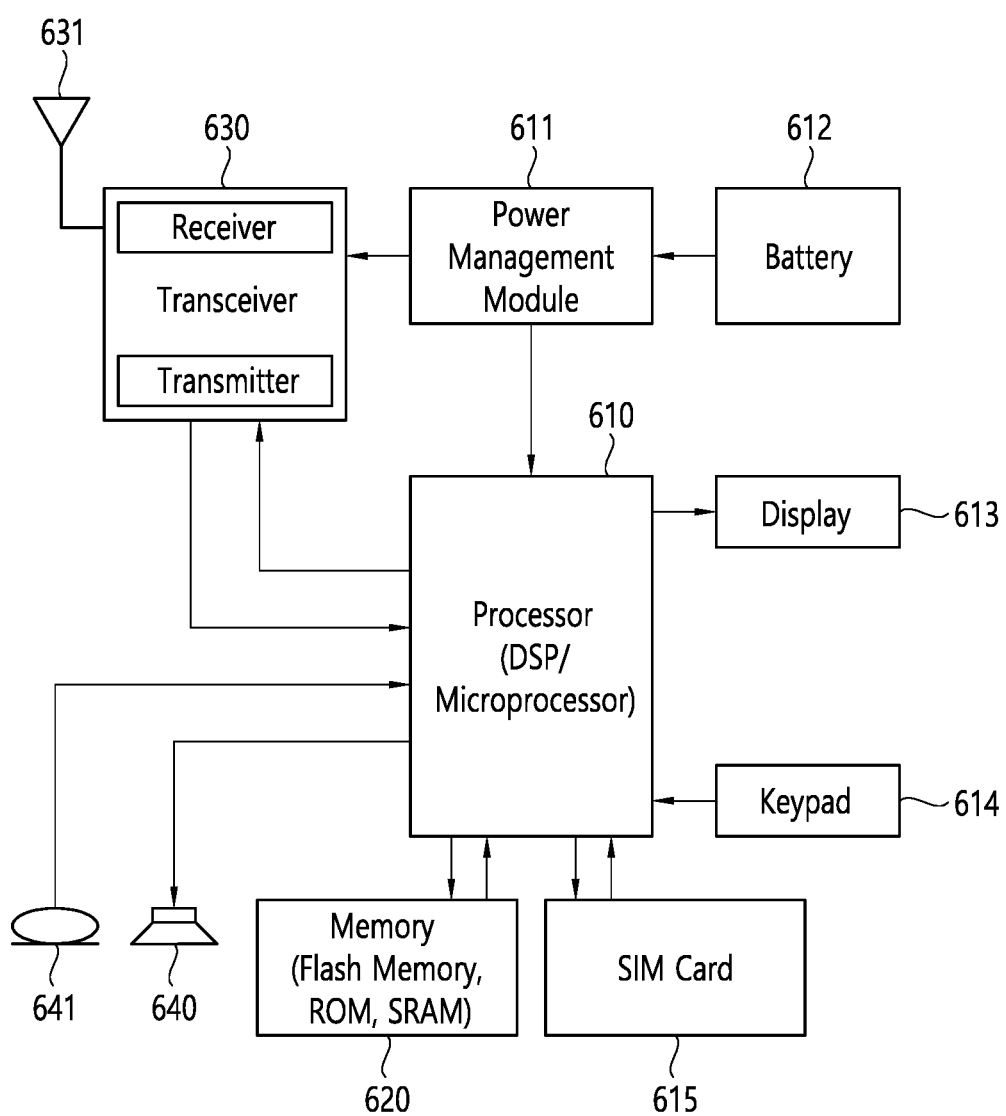
FIG. 28 illustrates a specific wireless device for implementing an embodiment of the present disclosure.

FIG. 28 illustrates a specific wireless device for implementing an embodiment of the present disclosure. The present disclosure described above with respect to a transmission device or a reception device may be applied to this embodiment.

A wireless device includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures, and/or methods described in this disclosure. Layers of the radio interface protocol may be implemented in the processor 610. The processor 610 may include application-specific integrated circuit (ASIC), other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

In a transmission device, the processor 610 transmits a Band Switch Announcement element to a STA through a first band supported by first and second RFs, change the first band supported by the second RF to a second band based on the Band Switch Announcement element, and transmits first data to the STA through the first band supported by the first RF and the second band supported by the second RF.

In a reception device, the processor 610 receives a Band Switch Announcement element from an AP through a first band supported by first and second RFs, and the first band supported by the second RF is changed to a second band based on the Band Switch Announcement element. The processor 610 receives first data from the AP through the first band supported by the first RF and the second band supported by the second RF.

The Band Witch Announcement element is used for the AP to notify the STA that a band supported by at least one RF is to be changed. Therefore, the AP may change a band supported by an RF after transmitting the Band Switch Announcement element without negotiating with the STA or receiving an ACK from the ACK.

In this embodiment, the AP assumes that the AP has the first and second RFs. Since the first and second RFs support the first band until the Band Switch Announcement element is transmitted, the AP can transmit data only through the first band. However, after the Band Switch Announcement element is transmitted, the first RF still supports the first band, while the second RF supports the second band to which the first band is changed.

In the next-generation WLAN system, the first and second RFs can change a band and thus may be referred to as switchable RFs. Although the embodiment is limited to a case where only a band supported by the second RF is changed, a band supported by the first RF may be changed by the Band Switch Announcement element.

The first band includes a first primary channel, and the second band includes a second primary channel.

When the multi-band includes only the two bands which are aggregated, the first band may be a 2.4 GHz or 5 GHz band, and the second band may be a 6 GHz band. When the multi-band further include a third band, the first band may be a 2.4 GHz band, the second band may be a 5 GHz band, and the third band may be a 6 GHz band. The foregoing configurations of the bands are provided only for illustration, and the WLAN system may support various numbers of bands and channels.

The Band Switch Announcement element may include band information on the second band.

The band information may include an Operating Class field, a Channel Number field, and a Number of Spatial Streams (NSS) field.

The Operating Class field may include operating class information on the second band. The Channel Number field may include operating channel information on the second band. The NSS field may include information on the second band and information on the number of spatial streams to be used for a channel in the second band.

The AP may indicate the number of RFs to be used in a new band based on the NSS field. That is, the AP may indicate some switchable RFs of which a supported band is changed based on the NSS field.

The band information may include a Basic Service Set Identifier (BSSID) field, a Beacon Interval field, an Enhanced Distributed Coordination Access (EDCA) Interval field, a Supported Rates field, and a Count field.

The BSSID field may include information on an identifier of a BSS configured for the second band. The Beacon Interval field may include information on a beacon interval configured for the channel in the second band.

The EDCA Interval field may include time information on an EDCA or scheduling access interval in the channel in the second band. The Supported Rates field may include information on a data rate supportable in the channel in the second band. The Count field may include information on the number of remaining transmissions of a beacon until the band supported by the second RF is changed.

An operation before transmitting the Band Switch Announcement element is as follows.

The AP may transmit second data to the STA through the first band. The second data may be transmitted by the first and second RFs before the Band Switch Announcement element is transmitted. That is, the first and second RFs transmit the data through the first band before the Band Switch Announcement element is transmitted. However, after the Band Switch Announcement element is transmitted, the band supported by the second RF is changed to the second band, and thus data may be transmitted though the multi-band.

Hereinafter, a signaling method for multi-band aggregation is described. In this embodiment, configuration information on a multi-band is described as being received, and signaling may be performed by employing an FST setup method.

A transmission device and a reception device to be illustrated below may correspond to the AP or the STA illustrated above. The transmission device may transmit a multi-band setup request frame to the reception device. The transmission device may receive a multi-band setup response frame from the reception device.

The transmission device may transmit a multi-band ACK request frame to the reception device. The transmission device may receive a multi-band ACK response frame from the reception device.

The transmission device may include a first station management entity (SME), a first MAC layer management entity (MLME), and a second MLME. The reception device may include a second SME, a third MLME, and a fourth MLME.

The first MLME and the third MLME may be entities supporting the first band, and the second MLME and the fourth MLME may be entities supporting the second band.

The multi-band setup request frame and the multi-band setup response frame may be transmitted and received between the first MLME and the third MLME. The multi-band ACK request frame and the multi-band ACK response frame may be transmitted and received between the second MLME and the fourth MLME.

The first and the second SMEs may generate a primitive including a multi-band parameter. The multi-band parameter may include a channel number designated in the multi-band, an operating class, and a band identifier (ID). The primitive may be transmitted to the first to fourth MLMEs.

When the FST setup method is employed for the multi-band aggregation, the FST setup method includes four states and a rule for a method of transitioning one state to a next state. The four states are Initial, Setup Completed, Transition Done, and Transition Confirmed states.

In the Initial state, the transmission device and the reception device communicate in an old band/channel. Here, when an FST setup request frame an FST setup response frame are transmitted and received between the transmission device and the reception device, the transmission device and the reception device transition to the Setup Completed state and are ready to change the currently operating band/channel(s). An FST session may be entirely or partially transferred to another band/channel.

When an LLT value included in the FST setup request frame is 0, the transmission device and the reception device transition from the Setup Completed state to the Transition Done state and are allowed to operate in different bands/channels.

Both the transmission device and the reception device need to succeed in communication in a new band/channel to reach the Transition Confirmed state. Here, when an FST ACK request frame and an FST ACK response frame are transmitted and received between the transmission device and the reception device, the transmission device and the reception device transition to the Transition Confirmed state and establish a complete connection in the new band/channel.

What is claimed is:

1. A method for transmitting data in a wireless local area network (WLAN) system, the method comprising:
    transmitting, by an access point (AP), a Band Switch Announcement element to a station (STA) through a first band supported by first and second radio frequencies (RFs);
    changing, by the AP, the first band supported by the second RF to a second band based on the Band Switch Announcement element; and
    transmitting, by the AP, first data to the STA through the first band supported by the first RF and the second band supported by the second RF,
    wherein the first data is transmitted through a multi-band into which the first band and the second band are aggregated,
    wherein the Band Switch Announcement element comprises band information on the second band,
    wherein the band information comprises a Basic Service Set Identifier (BSSID) field, a Beacon Interval field, an Enhanced Distributed Coordination Access (EDCA) Interval field, a Supported Rates field, and a Count field,
    wherein the BSSID field comprises information on an identifier of a BSS configured for the second band,
    wherein the Beacon Interval field comprises information on a beacon interval configured for a channel in the second band,
    wherein the EDCA Interval field comprises time information on an EDCA or scheduling access interval in the channel in the second band,
    wherein the Supported Rates field comprises information on a data rate supportable in the channel in the second band, and
    wherein the Count field comprises information on a number of remaining transmissions of a beacon until the band supported by the second RF is changed.

2. The method of claim 1, wherein the band information comprises an Operating Class field, a Channel Number field, and a Number of Spatial Streams (NSS) field,
    the Operating Class field comprises operating class information on the second band,
    the Channel Number field comprises operating channel information on the second band, and
    the NSS field comprises information on the second band and information on a number of spatial streams to be used for a channel in the second band.

3. The method of claim 1, wherein the band information comprises a Channel Change Mode field, and the Channel Change Mode field is a field prohibiting the STA from performing transmission until the band supported by the second RF is changed.

4. The method of claim 1, wherein the band information comprises a Basic Service Set Identifier (BSSID) field, a Beacon Interval field, an Enhanced Distributed Coordination Access (EDCA) Interval field, a Supported Rates field, and a Count field,
    the BSSID field comprises information on an identifier of a BSS configured for the second band,
    the Beacon Interval field comprises information on a beacon interval configured for a channel in the second band,
    the EDCA Interval field comprises time information on an EDCA or scheduling access interval in the channel in the second band,
    the Supported Rates field comprises information on a data rate supportable in the channel in the second band, and
    the Count field comprises information on a number of remaining transmissions of a beacon until the band supported by the second RF is changed.

5. The method of claim 1, further comprising:
    transmitting, by the AP, second data to the STA through the first band
    wherein the second data is transmitted by the first and second RFs before transmitting the Band Switch Announcement element.

6. The method of claim 1, wherein the first band is a 5 GHz band, and the second band is a 6 GHz band.

7. An access point (AP) for transmitting data in a wireless local area network (WLAN) system, the AP comprising:
    a memory;
    a transceiver; and
    a processor operatively coupled with the memory and the transceiver,
    wherein the processor transmits a Band Switch Announcement element to a station (STA) through a first band supported by first and second radio frequencies (RFs), changes the first band supported by the second RF to a second band based on the Band Switch Announcement element, and transmits first data to the STA through the first band supported by the first RF and the second band supported by the second RF, and
    wherein the first data is transmitted through a multi-band into which the first band and the second band are aggregated, wherein the Band Switch Announcement element comprises band information on the second band, wherein the band information comprises a Basic Service Set Identifier (BSSID) field, a Beacon Interval field, an Enhanced Distributed Coordination Access (EDCA) Interval field, a Supported Rates field, and a Count field, wherein the BSSID field comprises information on an identifier of a BSS configured for the second band, wherein the Beacon Interval field comprises information on a beacon interval configured for a channel in the second band, wherein the EDCA Interval field comprises time information on an EDCA or scheduling access interval in the channel in the second band, wherein the Supported Rates field comprises information on a data rate supportable in the channel in the second band, and wherein the Count field comprises information on a number of remaining transmissions of a beacon until the band supported by the second RF is changed.

8. The AP of claim 7, wherein the band information comprises an Operating Class field, a Channel Number field, and a Number of Spatial Streams (NSS) field, the Operating Class field comprises operating class information on the second band, the Channel Number field comprises operating channel information on the second band, and the NSS field comprises information on the second band and information on a number of spatial streams to be used for a channel in the second band.

9. The AP of claim 7, wherein the band information comprises a Channel Change Mode field, and the Channel Change Mode field is a field prohibiting the STA from performing transmission until the band supported by the second RF is changed.

10. The AP of claim 7, wherein the processor transmits second data to the STA through the first band, and the second data is transmitted by the first and second RFs before transmitting the Band Switch Announcement element.

11. The AP of claim 7, wherein the first band is a 5 GHz band, and the second band is a 6 GHz band.

12. A method for receiving data in a wireless local area network (WLAN) system, the method comprising:

receiving, by a station (STA), a Band Switch Announcement element from an access point (AP) through a first band supported by first and second radio frequencies (RFs), the first band supported by the second RF being changed to a second band based on the Band Switch Announcement element; and receiving, by the STA, first data from the AP through the first band supported by the first RF and the second band supported by the second RF, wherein the first data is transmitted through a multi-band into which the first band and the second band are aggregated, wherein the Band Switch Announcement element comprises band information on the second band, wherein the band information comprises a Basic Service Set Identifier (BSSID) field, a Beacon Interval field, an Enhanced Distributed Coordination Access (EDCA) Interval field, a Supported Rates field, and a Count field, wherein the BSSID field comprises information on an identifier of a BSS configured for the second band, wherein the Beacon Interval field comprises information on a beacon interval configured for a channel in the second band, wherein the EDCA Interval field comprises time information on an EDCA or scheduling access interval in the channel in the second band, wherein the Supported Rates field comprises information on a data rate supportable in the channel in the second band, and wherein the Count field comprises information on a number of remaining transmissions of a beacon until the band supported by the second RF is changed.

* * * * *